(12) United States Patent
Liu et al.

(10) Patent No.: US 12,386,138 B2
(45) Date of Patent: Aug. 12, 2025

(54) OPTICAL LENS ASSEMBLY AND ELECTRONIC DEVICE

(71) Applicant: LARGAN PRECISION CO., LTD., Taichung (TW)

(72) Inventors: Ssu-Hsin Liu, Taichung (TW); Chen-Wei Fan, Taichung (TW); Ming-Ta Chou, Taichung (TW); Chien-Pang Chang, Taichung (TW); Wen-Yu Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 489 days.

(21) Appl. No.: 18/049,696

(22) Filed: Oct. 26, 2022

(65) Prior Publication Data

US 2023/0143018 A1    May 11, 2023

Related U.S. Application Data

(60) Provisional application No. 63/275,966, filed on Nov. 5, 2021.

(51) Int. Cl.
*G02B 7/02* (2021.01)
*H04N 23/55* (2023.01)

(52) U.S. Cl.
CPC .............. *G02B 7/021* (2013.01); *H04N 23/55* (2023.01)

(58) Field of Classification Search
CPC . G02B 5/22; G02B 5/003; G02B 7/02; G02B 7/021; G02B 7/022; G02B 7/023; G02B 7/025; G02B 7/026; H04N 23/55
See application file for complete search history.

(56) References Cited

U.S. PATENT DOCUMENTS

| | | |
|---|---|---|
| 6,950,236 B2 | 9/2005 | Hokazono et al. |
| 8,691,351 B2 | 4/2014 | Asakura et al. |
| 9,638,832 B1 | 5/2017 | Su |
| 11,327,299 B2 | 5/2022 | Lai et al. |
| 2004/0114248 A1 | 6/2004 | Hokazono et al. |
| 2019/0227202 A1 | 7/2019 | Nagahama et al. |
| 2020/0088969 A1 | 3/2020 | Nagahama et al. |
| 2020/0174167 A1 | 6/2020 | Chu |

(Continued)

FOREIGN PATENT DOCUMENTS

| | | |
|---|---|---|
| CN | 1502048 A | 6/2004 |
| CN | 106773454 A | 5/2017 |

(Continued)

*Primary Examiner* — Ephrem Z Mebrahtu
(74) *Attorney, Agent, or Firm* — McClure, Qualey & Rodack, LLP

(57) ABSTRACT

An optical lens assembly includes a lens barrel and an optical lens group. The lens barrel includes a light entering hole, which is configured for allowing a light to enter the lens barrel. The lens barrel accommodates the optical lens group, and an optical axis passes through the optical lens group. The optical lens group includes a plurality of lens elements and at least one light blocking sheet. The light blocking sheet is an opaque sheet-shaped element and surrounds the optical axis to form a light passing hole. The light blocking sheet includes an object-side surface and an image-side surface, and the object-side surface is located more adjacent to the light entering hole than the image-side surface thereto. A first film layer is disposed on the object-side surface.

18 Claims, 23 Drawing Sheets

(56) References Cited

U.S. PATENT DOCUMENTS

| | | | |
|---|---|---|---|
| 2020/0272030 A1 | 8/2020 | Tsai | |
| 2021/0072487 A1* | 3/2021 | Cheng | ............... G03B 30/00 |
| 2021/0165136 A1 | 6/2021 | Tsai et al. | |

FOREIGN PATENT DOCUMENTS

| | | |
|---|---|---|
| CN | 107305259 A | 10/2017 |
| CN | 109791231 A | 5/2019 |
| CN | 209028384 U | 6/2019 |
| CN | 210119624 U | 2/2020 |
| TW | 567338 B | 12/2003 |
| TW | 201339628 A | 10/2013 |
| TW | 201901193 A | 1/2019 |
| TW | I676852 B | 11/2019 |
| TW | I707169 B | 10/2020 |
| WO | 2013088836 A1 | 6/2013 |

\* cited by examiner

340

350

OPTICAL LENS ASSEMBLY AND ELECTRONIC DEVICE

RELATED APPLICATIONS

This application claims priority to U.S. Provisional Application Ser. No. 63/275,966, filed Nov. 5, 2021, which is herein incorporated by reference.

BACKGROUND

Technical Field

The present disclosure relates to an optical lens assembly and an electronic device. More particularly, the present disclosure relates to a compact optical lens assembly that is applicable to electronic devices.

Description of Related Art

In recent years, portable electronic devices have developed rapidly. For example, intelligent electronic devices and tablets have been filled in the lives of modern people, and optical lens assemblies thereof mounted on portable electronic devices have also prospered. However, as technology advances, the requirements of the appearance quality of the electronic devices and the optical lens assemblies thereof are becoming higher and higher. Therefore, an electronic device with an optical lens assembly, which can balance the appearance recognition and the image quality, needs to be developed.

SUMMARY

According to one aspect of the present disclosure, an optical lens assembly includes a lens barrel and an optical lens group. The lens barrel includes a light entering hole, which is configured for allowing a light to enter the lens barrel. The lens barrel accommodates the optical lens group, and an optical axis passes through the optical lens group. The optical lens group includes a plurality of lens elements and at least one light blocking sheet. The light blocking sheet is an opaque sheet-shaped element and surrounds the optical axis to form a light passing hole. The light blocking sheet includes an object-side surface and an image-side surface, and the object-side surface is located more adjacent to the light entering hole than the image-side surface thereto. A first film layer is disposed on the object-side surface. A reflected light is obtained from the first film layer irradiated by a standard illuminant D65, a color index of the reflected light is defined according to a CIE 1976 L*a*b* color space, the color index is CI, the reflected light has a maximum reflectivity in a spectrum in a wavelength range of 380 nm to 780 nm, a wavelength range of a wavelength corresponding to the maximum reflectivity minus 50 nm to the wavelength thereto plus 50 nm is a high reflectivity section, a wavelength range remained in a wavelength range of 380 nm to 780 nm excluding the high reflectivity section is a second reflectivity section, an average reflectivity in the high reflectivity section is $R_{high}$, an average reflectivity in the second reflectivity section is $R_2$, the following conditions are satisfied: $CI=\{(L^*)\times[(a^*)^2+(b^*)^2]\}^{1/2}$; $8 \leq CI \leq 41$; and $1.8 \leq R_{high}/R_2 \leq 6.2$.

According to another aspect of the present disclosure, an electronic device includes the optical lens assembly according to the foregoing aspect.

BRIEF DESCRIPTION OF THE DRAWINGS

The present disclosure can be more fully understood by reading the following detailed description of the embodiment, with reference made to the accompanying drawings as follows:

FIG. 10 is a partially cross-sectional view of the optical lens assembly in FIG. 1A.

DETAILED DESCRIPTION

Figure 1A:
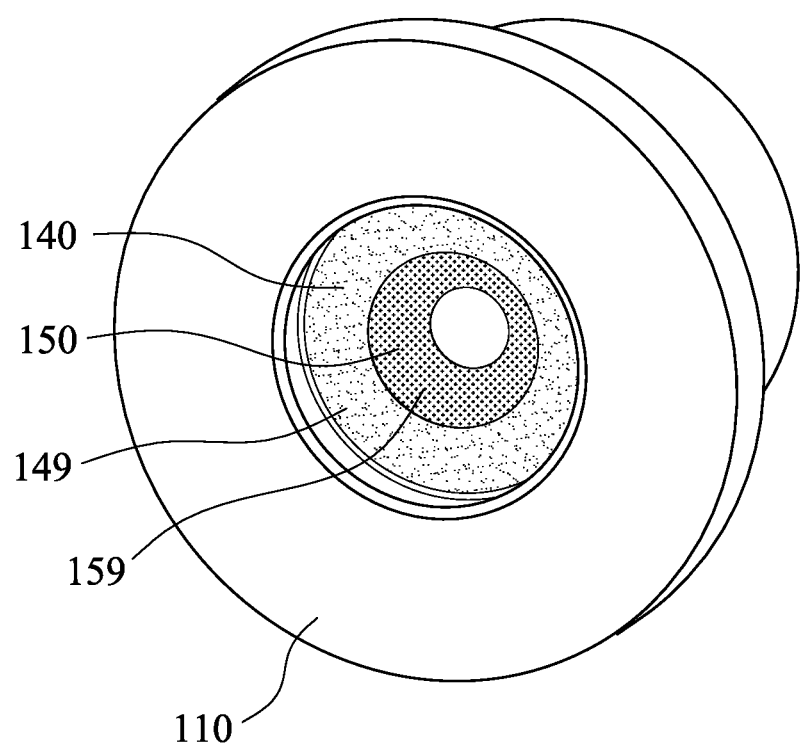
FIG. 1A is a three-dimensional view of an optical lens assembly according to the 1st embodiment of the present disclosure.

According to one aspect of the present disclosure, an optical lens assembly is provided. The optical lens assembly includes a lens barrel and an optical lens group. The lens barrel includes a light entering hole, which is configured for allowing a light to enter the lens barrel, i.e., the light enters the lens barrel via the light entering hole. The lens barrel accommodates the optical lens group, and an optical axis passes through the optical lens group. The optical lens group includes a plurality of lens elements and at least one light blocking sheet. The light blocking sheet is an opaque sheet-shaped element and surrounds the optical axis to form a light passing hole. The light blocking sheet includes an object-side surface and an image-side surface, and the object-side surface is located more adjacent to the light entering hole than the image-side surface thereto. A first film layer is disposed on the object-side surface. A reflected light is obtained (i.e., reflected) from (one point on) the first film layer irradiated by a standard illuminant D65, a color index of the reflected light is defined according to a CIE 1976 L*a*b* color space, the color index is CI, the reflected light has a maximum reflectivity in a spectrum in a wavelength range of 380 nm to 780 nm, a wavelength range of a wavelength corresponding to the maximum reflectivity minus 50 nm to the wavelength corresponding to the maximum reflectivity plus 50 nm is a high reflectivity section, a wavelength range remained in a wavelength range of 380 nm to 780 nm excluding the high reflectivity section is a second reflectivity section, an average reflectivity in the high reflectivity section is $R_{high}$, an average reflectivity in the second reflectivity section is $R_2$, the following conditions are satisfied: $CI=\{(L^*)\times[(a^*)^2+(b^*)^2]\}^{1/2}$; $8 \leq CI \leq 41$; and $1.8 \leq R_{high}/R_2 \leq 6.2$. Therefore, the color index satisfying the aforementioned conditions is favorable for the light blocking sheet to have colors other than gray-scale tones, which can improve the appearance recognition of the optical lens assembly, so that the appearance of the optical lens assembly achieves a unique visual experience. Among the wavelength band of visible light, only part of the wavelength band having a high average reflectivity is advantageous in preventing the light blocking sheet from the stray light to affect the image quality. The first film layer may be formed by high and low refractive index layers alternately stacked, and the color of the reflected light from the first film layer can be adjusted by controlling the thicknesses of high and low refractive index layers. Moreover, the surface of the light blocking sheet has a specific wavelength band distribution with high and low reflectivity (about blue of cool color tone), and maintains the coordinates of a specific color space. The coating with the specific high and low reflectivity distribution can also be applied to the lens barrel and the lens element, while maintaining the coordinates of the specific color space. Furthermore, the following conditions may be satisfied by the aforementioned optical lens assembly: $11 \leq CI \leq 28$; and $2.2\ R_{high}/R_2 \leq 4.8$.

Moreover, a color is defined with three values of L*a*b* according to the CIE 1976 L*a*b* color space, L* represents the perceived brightness (L*=0 for black, and L*=100 for white), a* represents green and red (a*=−128 for green, and a*=127 for red), and b* represents blue and yellow (b*=−128 for blue, and b*=127 for yellow). The object under test is placed on the carrying platform of the reflectivity measuring instrument, the standard illuminant D65 is vertically incident on the first film layer at an incident angle of 0 degrees, a measurement is performed at a position of a reflection angle of 0 degrees with a maximum field of view (FOV) of 2 degrees, and a reflectivity and the values of L*a*b* of the reflected light can be measured. In addition, the wavelength range of the wavelength corresponding to the maximum reflectivity minus 50 nm to the wavelength thereto plus 50 nm is the high reflectivity section. However, if a lower limit or an upper limit of the wavelength range of the wavelength corresponding to the maximum reflectivity minus and plus 50 nm is smaller than 380 nm or greater than 780 nm, the lower limit of the high reflectivity section is set as 380 nm or the upper limit of the high reflectivity section is set as 780 nm.

Figure 2A:
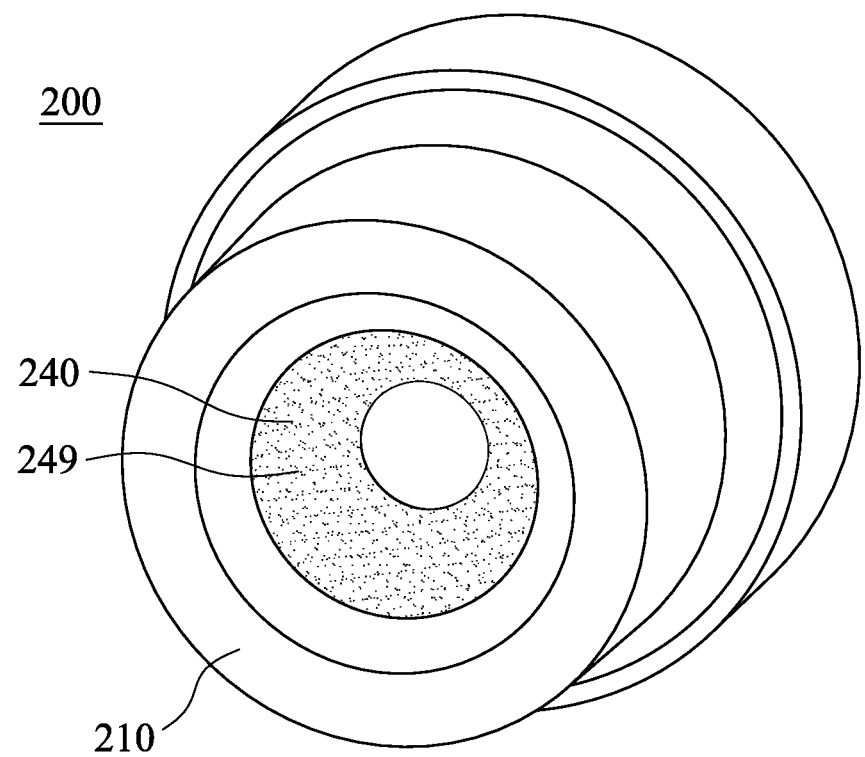
FIG. 2A is a three-dimensional view of an optical lens assembly according to the 2nd embodiment of the present disclosure.
Figure 2B:
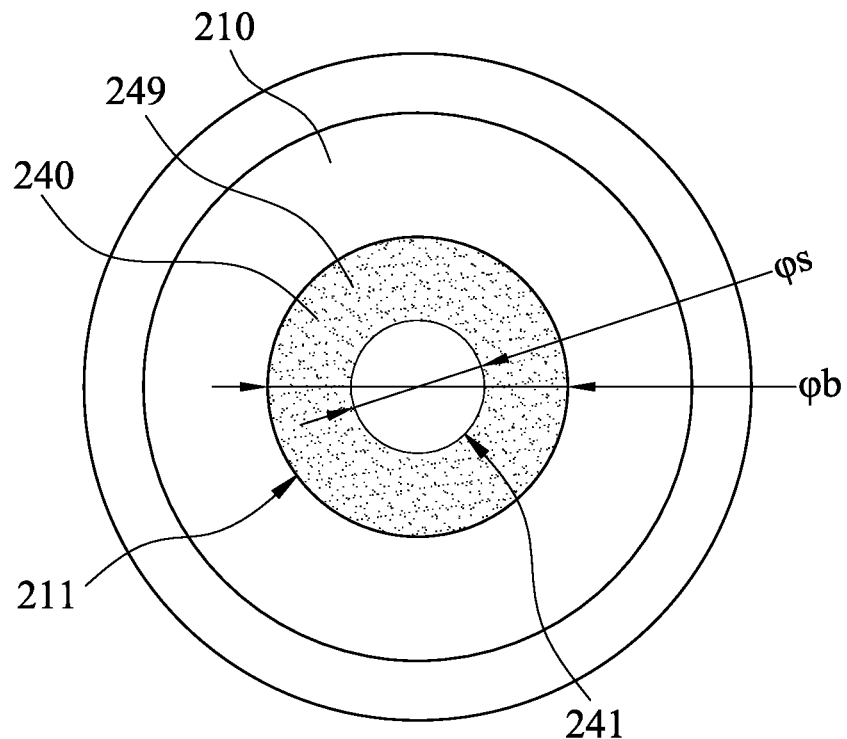
FIG. 2B is a top view of the optical lens assembly in FIG. 2A.
Figure 2C:
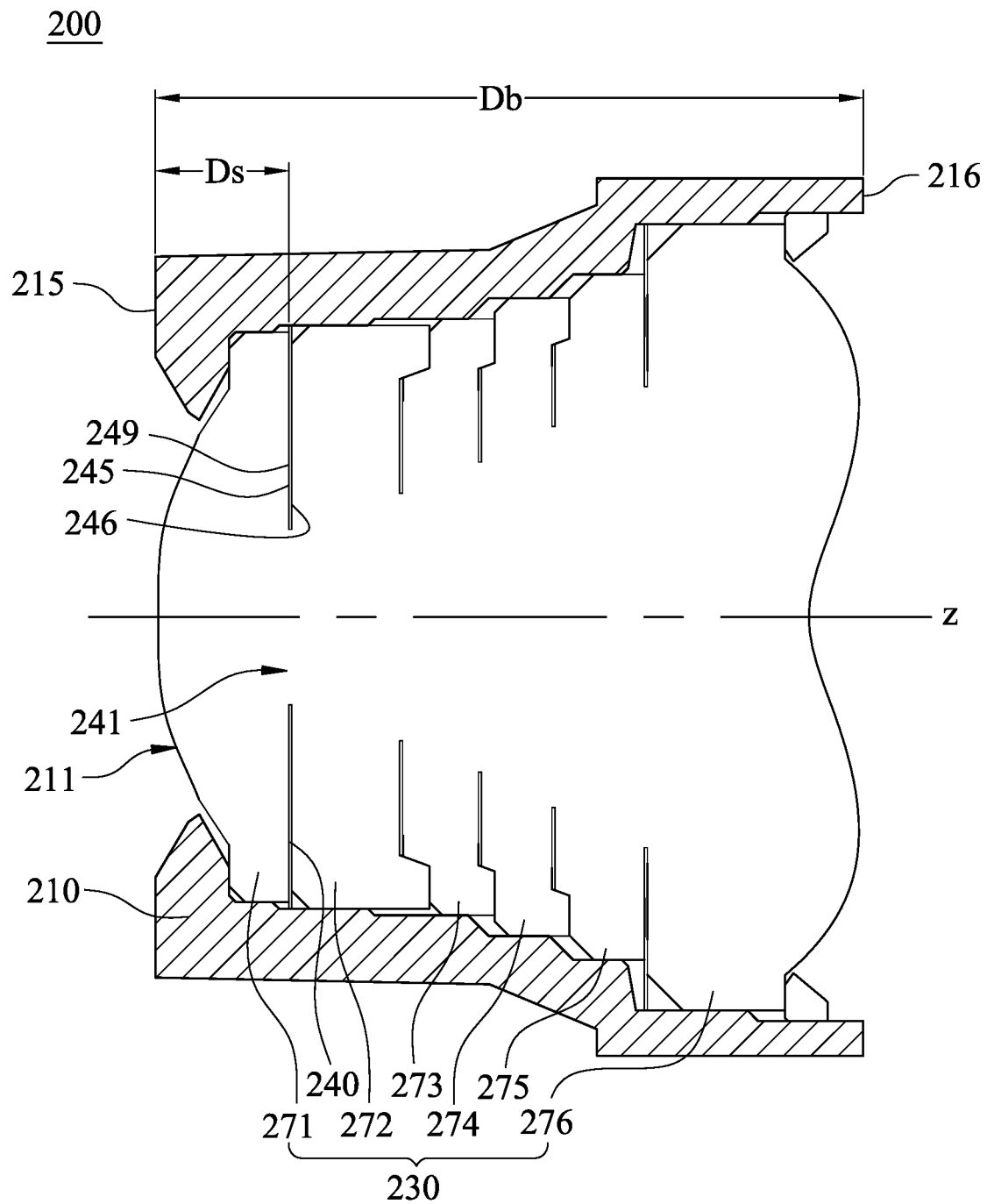
FIG. 2C is a partially cross-sectional view of the optical lens assembly in FIG. 2A.
Figure 2D:
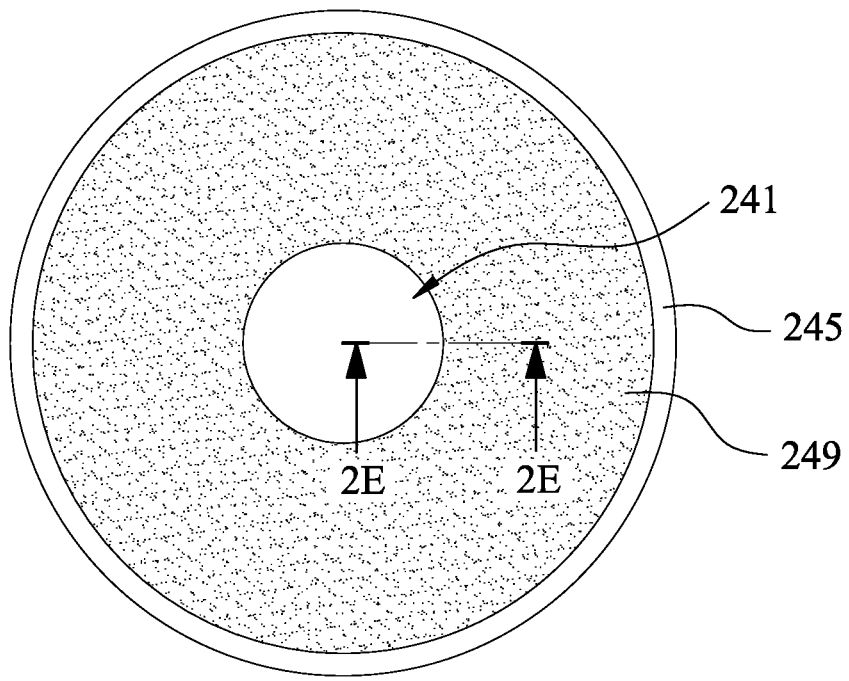
FIG. 2D is a top view of a light blocking sheet of the optical lens assembly in FIG. 2A.
Figure 2E:
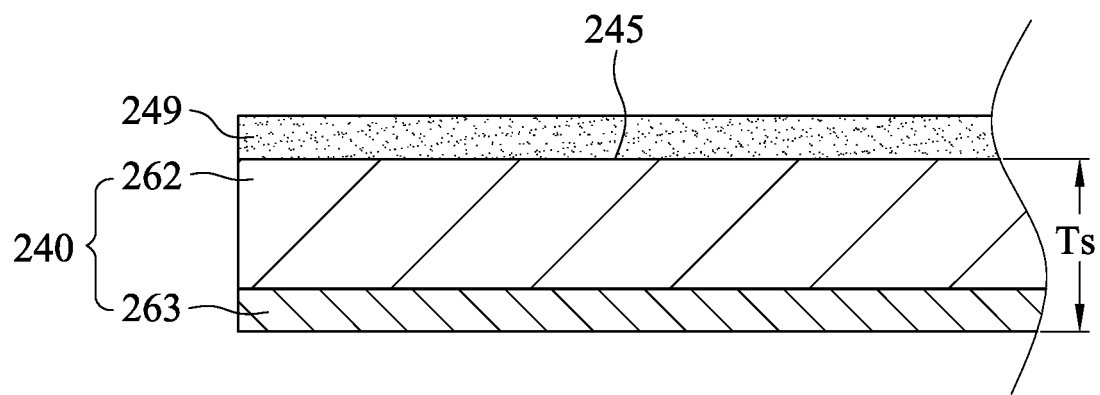
FIG. 2E is a cross-sectional view along line 2E-2E in FIG. 2D.
Figure 2F:
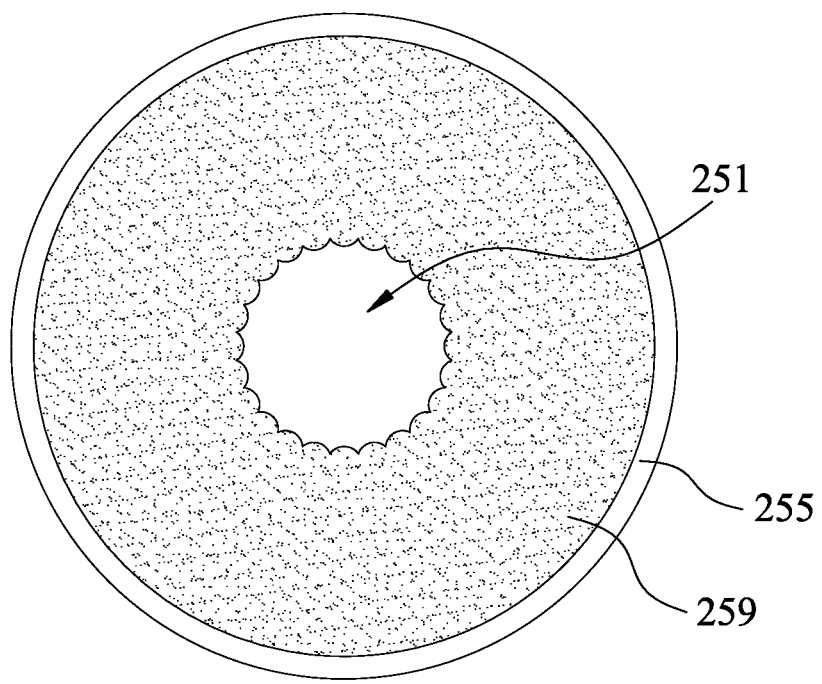
FIG. 2F is a top view of a light blocking sheet that can be applicable to the optical lens assembly in FIG. 2A.

Furthermore, the outline of the light passing hole observed at the optical axis may be a circular shape or any shape (e.g., the outline of the light passing hole is formed by a plurality of arc shapes connected, as shown in FIG. 2F), but is not limited thereto. In addition, a diameter of the light passing hole may gradually increase from the image side surface to the object side surface.

In detail, when the wavelength corresponding to the maximum reflectivity is $\lambda_{RMax}$, the following condition may be satisfied: $380\ nm \leq \lambda 580\ nm$. Therefore, controlling the wavelength corresponding to the maximum reflectivity is favorable for avoiding the wavelength band that results in more stray light, and thereby improving the image quality.

When the maximum reflectivity is RMax, the following condition may be satisfied: $0.5\% \leq R_{max} \leq 4\%$. Therefore, controlling the maximum reflectivity of the first film layer is favorable for the first film layer to have color and luster and reduce the stray light, so as to improve the image quality.

When an average reflectivity of the reflected light in the wavelength range of 380 nm to 780 nm is $R_{3878}$, the following condition may be satisfied: $0.1\% \leq R_{3878} \leq 2\%$. Therefore, the visible light band of the overall reflected light maintaining a low reflectivity is advantages in preventing the image quality from being affected by the stray light.

A difference appears between two color indexes of any two points, respectively, on the first film layer. When an absolute value of the difference is $|\Delta CI|$, the following condition may be satisfied: $0 \leq |\Delta CI| \leq 4.7$. Therefore, a smaller difference between the color indexes of the first film layer indicates a more uniform distribution of color and luster and a better appearance quality.

The first film layer may be disposed from the light passing hole along a direction being away from the optical axis, and a coverage area of the first film layer is smaller than an area of the object-side surface. Therefore, the first film layer not completely covering the object-side surface of the light blocking sheet is beneficial to mass production.

A number of the at least one light blocking sheet may be at least two, and the first film layer is disposed on the object-side surface of each of the light blocking sheets. Diameters of the light passing holes of the at least two light blocking sheets, respectively, may be different, and the diameter of the light passing hole of one of the at least two light blocking sheets closer to an object side is greater than the diameter of the light passing hole of the other of the at least two light blocking sheets. Therefore, the two light blocking sheets can be observed from the outside the lens barrel at the same time. Colors of the first film layers of the two light-blocking sheets may be the same, so that the appearance of the optical lens assembly is consistent. Alternately, the colors of the first film layers of the two light-blocking sheets may be slightly different, so that the optical lens assembly has a gradient effect in the visual appearance, but is not limited thereto.

When a thickness in a direction along the optical axis of the light blocking sheet is Ts, the following condition may be satisfied: $7\ \mu m < Ts < 50\ \mu m$. In detail, the light blocking sheet may include a base layer and two covering layers, an object-side surface of the base layer is in physical contact with one of the covering layers, an object-side surface of the one of the covering layers is in physical contact with the first film layer, and an image side surface of the base layer is in physical contact with the other of the covering layers. Alternately, the light blocking sheet may include a base layer and a covering layer, an object-side surface of the base layer is in physical contact with the first film layer, and an image side surface of the base layer is in physical contact with the covering layer. A material of the base layer can be plastic, e.g., PI or PET, and the material of the base layer can be metal, e.g., free-cutting brass or copper alloy, but is not limited thereto.

When a diameter of the light entering hole is φb, and a diameter of the light passing hole is φs, the following condition may be satisfied: φs<φb. Furthermore, the following condition may be satisfied: $0.31 \leq (\varphi b - \varphi s)/\varphi b \leq 0.95$. Therefore, when any of the aforementioned conditions is satisfied, there is a higher proportion that the light blocking sheet can be observed by the naked eyes from the outside of the lens barrel, so as to improve the appearance consistency of the optical lens assembly.

When a maximum field of view of the optical lens assembly is FOV, the following condition may be satisfied: 93 degrees≤FOV≤175 degrees. Therefore, for the optical lens assembly satisfying the aforementioned condition, the light blocking sheet is favorable for significantly improving the appearance of the optical lens assembly.

In a direction along the optical axis, when a distance between a most object-side end of the lens barrel and a most image-side end of the lens barrel is Db, and a distance between the most object-side end of the lens barrel and the first film layer is Ds, the following condition may be satisfied: $0.05 \leq Ds/Db \leq 0.41$. Therefore, the light blocking sheet disposed close to the light entering hole of the lens barrel is beneficial to observe the light blocking sheet from the outside of the lens barrel.

An object-side portion of the lens barrel may include a top wall surrounding the optical axis to form the light entering hole, and a second film layer is disposed on the top wall. Another reflected light is obtained from the second film layer irradiated by the standard illuminant D65, another color index of the another reflected light is defined according to the CIE 1976 L*a*b* color space, the another color index is CI2, the another reflected light has another maximum reflectivity in another spectrum in the wavelength range of 380 nm to 780 nm, a wavelength range of a wavelength corresponding to the another maximum reflectivity minus 50 nm to the wavelength thereto plus 50 nm is another high reflectivity section, a wavelength range remained in a wavelength range of 380 nm to 780 nm excluding the another high reflectivity section is another second reflectivity section, an average reflectivity in the another high reflectivity section is $R2_{high}$, an average reflectivity in the another second reflectivity section is $R2_2$, and the following conditions may be satisfied: $CI2=\{(L^*)\times[(a^*)^2+(b^*)^2]\}^{1/2}$, $11 \leq CI2 \leq 41$; and $1.8 \leq R2_{high}/R2_2 \leq 6.2$. Therefore, the top wall of the lens barrel with the second film layer disposed thereon is favorable for having a sense of visual extension of the color and luster so as to improve the appearance consistency of the optical lens assembly.

One of the lens elements may be disposed on an object side of the light blocking sheet, and the one of the lens elements includes an optical effective region and a peripheral region. The optical effective region is configured for being passed through by the light. The peripheral region is located farther from the optical axis than the optical effective region therefrom, and a third film layer is disposed on at least one of a peripheral object-side surface and a peripheral image-side surface of the peripheral region. Further another reflected light is obtained from the third film layer irradiated by the standard illuminant D65, further another color index of the further another reflected light is defined according to the CIE 1976 L*a*b* color space, the further another color index is CI3, and the following conditions may be satisfied: $CI3=\{(L^*)\times[(a^*)^2+(b^*)^2]\}^{1/2}$; and $11 \leq CI3 \leq 75$. Therefore, the peripheral region of the lens element with the third film layer disposed thereon is favorable for improving the appearance consistency of the optical lens assembly. In addition, the optical effective region of the lens element may have another third film layer disposed thereon. Furthermore, a material of the lens element enables the third film layer to present a brighter color and luster, and thereby the higher color index CI3 is obtained.

Continuing from the previous paragraph, the further another reflected light is obtained from the third film layer irradiated by the standard illuminant D65, the further another reflected light has further another maximum reflectivity in further another spectrum in the wavelength range of 380 nm to 780 nm, a wavelength range of a wavelength corresponding to the further another maximum reflectivity minus 50 nm to the wavelength thereto plus 50 nm is further another high reflectivity section, a wavelength range remained in a wavelength range of 380 nm to 780 nm excluding the further another high reflectivity section is further another second reflectivity section, an average reflectivity in the further another high reflectivity section is $R3_{high}$, an average reflectivity in the further another second reflectivity section is $R3_2$, and the following conditions are satisfied: $2.5 \leq R3_{high}/R3_2 \leq 34$. Therefore, it is favorable for improving the appearance consistency of the optical lens assembly.

According to another aspect of the present disclosure, an electronic device is provided. The electronic device includes the aforementioned optical lens assembly. Therefore, the optical lens assembly of the present disclosure is favorable for improving the appearance and the visual experience of the electronic device, and can be applied to the electronic devices such as smart phones (with dual lens assemblies or multiple lens assemblies), tablet computers, portable video recorders, wearable devices, etc., but is not limited thereto. Furthermore, the light blocking sheet in the present disclosure is favorable for applying in an ultra-wide-angle lens assembly to have a better effect, but is not limited thereto.

Each of the aforementioned features can be utilized in various combinations for achieving the corresponding effects. According to the aforementioned aspects, specific embodiments are provided, and illustrated via figures.

1st Embodiment

Figure 1B:
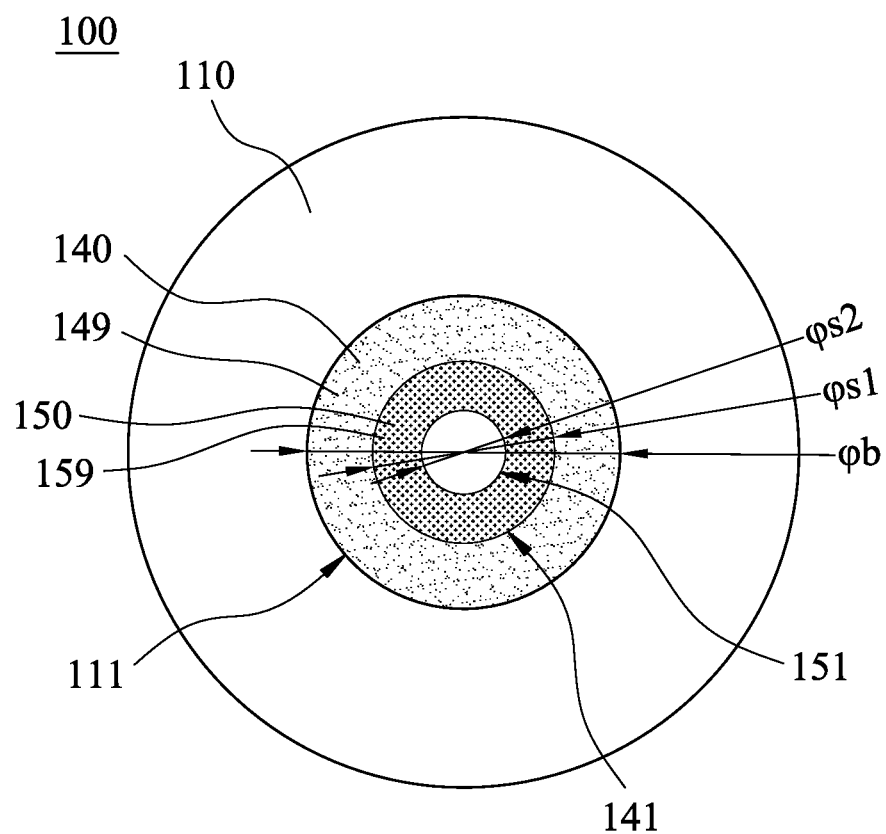
FIG. 1B is a top view of the optical lens assembly in FIG. 1A.
Figure 1C:
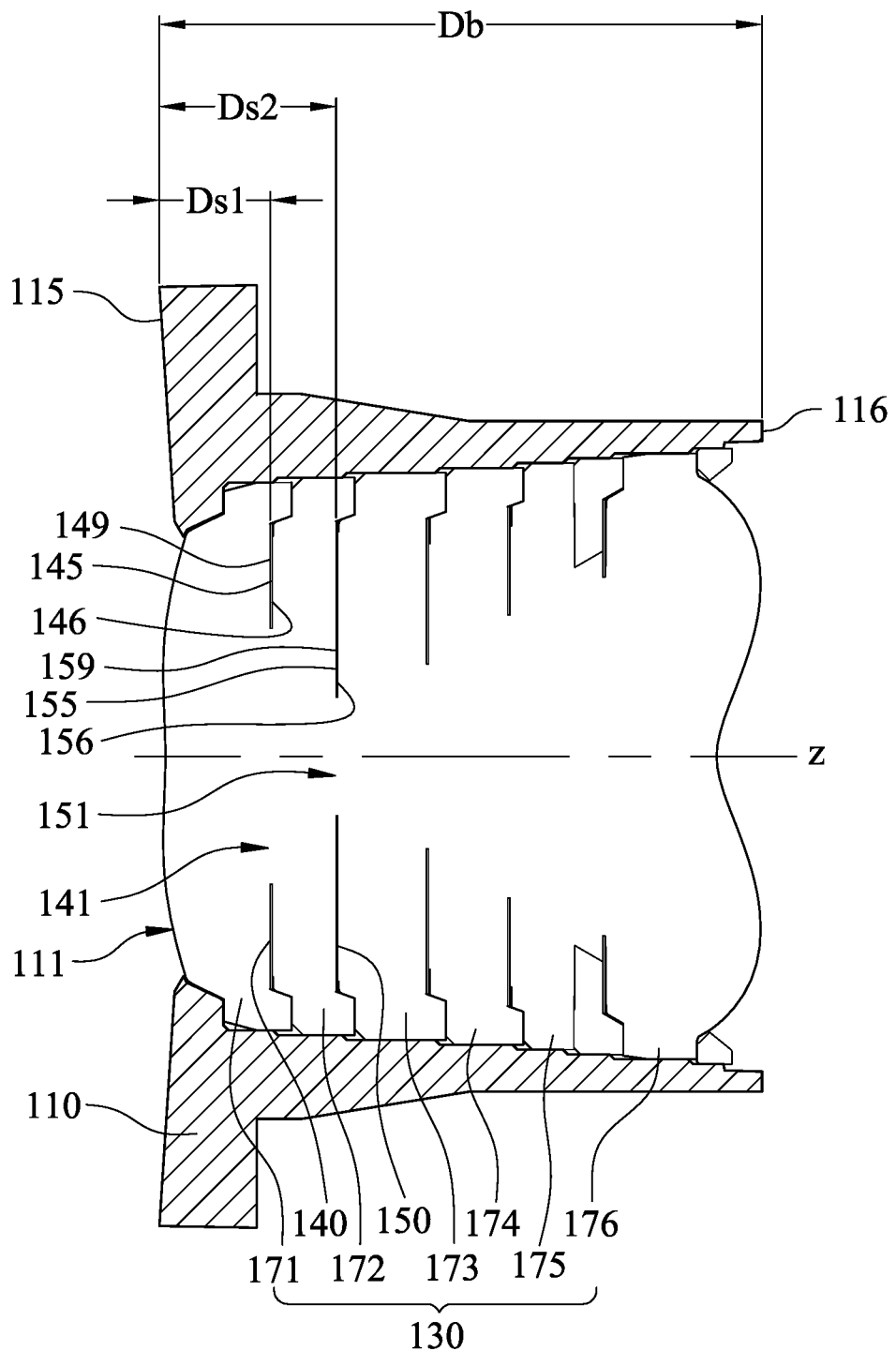
FIG. 1D is a top view of a first light blocking sheet of the optical lens assembly in FIG. 1A.
FIG. 1E is a top view of a second light blocking sheet of the optical lens assembly in FIG. 1A.
FIG. 1F is a cross-sectional view along line 1F-1F in FIG. 1E.
FIG. 1G is a schematic view of reflectivity of the first light blocking sheet and the second light blocking sheet of the optical lens assembly in FIG. 1A.
FIG. 1H is a schematic view of the reflectivity of the first light blocking sheet of the optical lens assembly in FIG. 1A.
FIG. 1I is a schematic view of the reflectivity of the second light blocking sheet of the optical lens assembly in FIG. 1A.

FIG. 1A is a three-dimensional view observed from an object side of an optical lens assembly 100 according to the 1st embodiment of the present disclosure, FIG. 1B is a top view observed from the object side of the optical lens assembly 100 in FIG. 1A, and FIG. 10 is a partially cross-sectional view of the optical lens assembly 100 in FIG. 1A. With reference to FIG. 1A to FIG. 10, the optical lens assembly 100 includes a lens barrel 110 and an optical lens group 130. The lens barrel 110 includes a light entering hole 111, which is configured for allowing a light to enter the lens barrel 110. The lens barrel 110 accommodates the optical lens group 130, and an optical axis z passes through the optical lens group 130 (as shown in FIG. 10). The optical lens group 130 includes a first lens element 171, a second lens element 172, a third lens element 173, a fourth lens element 174, a fifth lens element 175 and a sixth lens element 176 in order from the object side (i.e., a left side in FIG. 10) to an image side (i.e., a right side in FIG. 10) along the optical axis z. A total number of lens elements in the optical lens group 130 is six. The reference numerals of the transparent lens elements such as the first lens element 171, etc. are omitted in FIG. 1A and FIG. 1B. Partial surface shapes of the lens elements are omitted in FIG. 10. It should be understood that the total number and the surface shapes of the lens elements in the optical lens assembly of the present disclosure are not limited thereto. A number of the light blocking sheet of the optical lens group 130 is at least two, and the optical lens group 130 specifically further includes annular optical elements such as a first light blocking sheet 140, a second light blocking sheet 150, another light blocking sheet, a spacer, a retainer, etc. The first light blocking sheet 140 is disposed and connected between the first lens element 171 and the second lens element 172, and the second light blocking sheet 150 is disposed and connected between the second lens element 172 and third lens element 173.

Figure 1D:
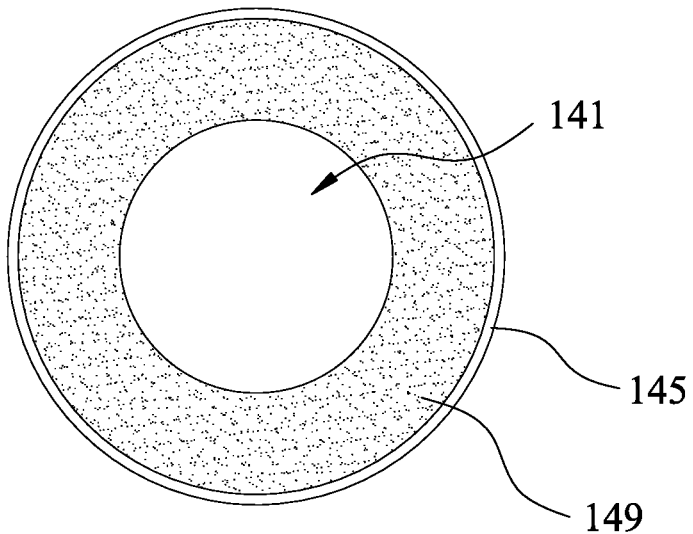
Figure 1E:
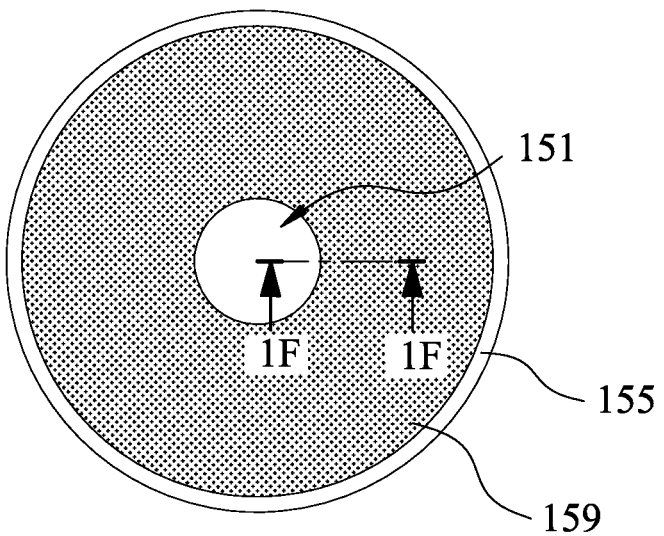

FIG. 1D is a top view of the first light blocking sheet 140 of the optical lens assembly 100 in FIG. 1A, and FIG. 1E is a top view of the second light blocking sheet 150 of the optical lens assembly 100 in FIG. 1A. With reference to FIG. 10 to FIG. 1E, the first light blocking sheet 140 is an opaque sheet-shaped element and surrounds the optical axis z to form a light passing hole 141. The first light blocking sheet 140 includes an object-side surface 145 and an image-side surface 146, and the object-side surface 145 is located more adjacent to the light entering hole 111 than the image-side surface 146 thereto. A first film layer 149 is disposed on the object-side surface 145. The second light blocking sheet 150 is an opaque sheet-shaped element and surrounds the optical axis z to form a light passing hole 151. The second light blocking sheet 150 includes an object-side surface 155 and an image-side surface 156, and the object-side surface 155 is located more adjacent to the light entering hole 111 than the image-side surface 156 thereto. A first film layer 159 is disposed on the object-side surface 155. Furthermore, it should be understood that the dotted parts in the related drawings of the present disclosure are only intended to clearly represent the areas covered by the film layers, and not intended to represent the actual colors or color shades of the film layers.

The first film layer 149 is disposed from the light passing hole 141 along a direction being away from the optical axis z, and a coverage area of the first film layer 149 is smaller than an area of the object-side surface 145. The first film layer 159 is disposed from the light passing hole 151 along the direction being away from the optical axis z, and a coverage area of the first film layer 159 is smaller than an area of the object-side surface 155.

Diameters of the light passing holes 141, 151 of the first light blocking sheet 140 and the second light blocking sheet 150, respectively, are different. The diameter of the light passing hole 141 of the first light blocking sheet 140 closer to the object side is greater than the diameter of the light passing hole 151 of the second light blocking sheet 150.

Figure 1F:
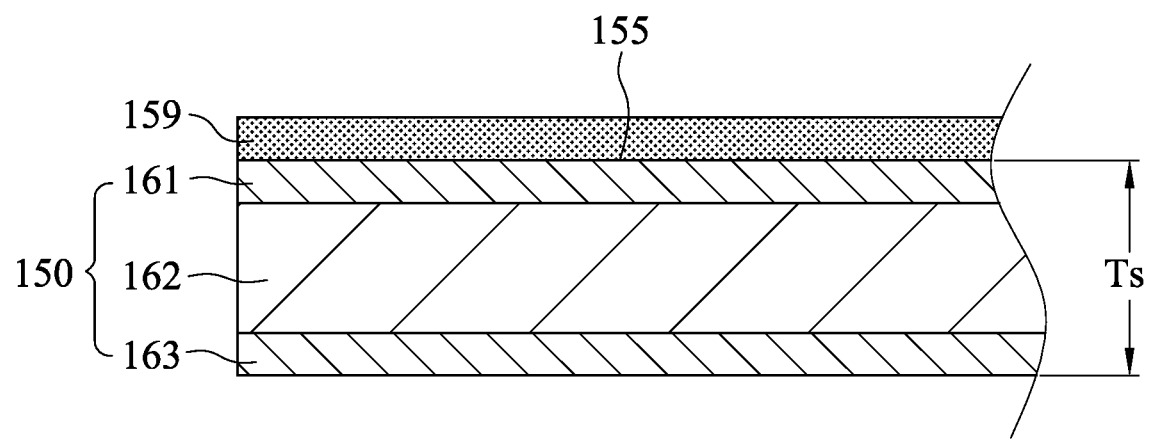

FIG. 1F is a cross-sectional view along line 1F-1F in FIG. 1E (not drawn with an actual scale). With reference to FIG. 1F, the second light blocking sheet 150 specifically includes a base layer 162 and two covering layers 161, 163. An object-side surface of the base layer 162 is in physical contact with the covering layer 161, an image side surface of the base layer 162 is in physical contact with the covering layer 163, and the first film layer 159 is disposed on an object-side surface of the covering layer 161. In addition, the structure of the first light blocking sheet 140 may be the same as the structure of the second light blocking sheet 150 described in this paragraph.

Figure 1G:
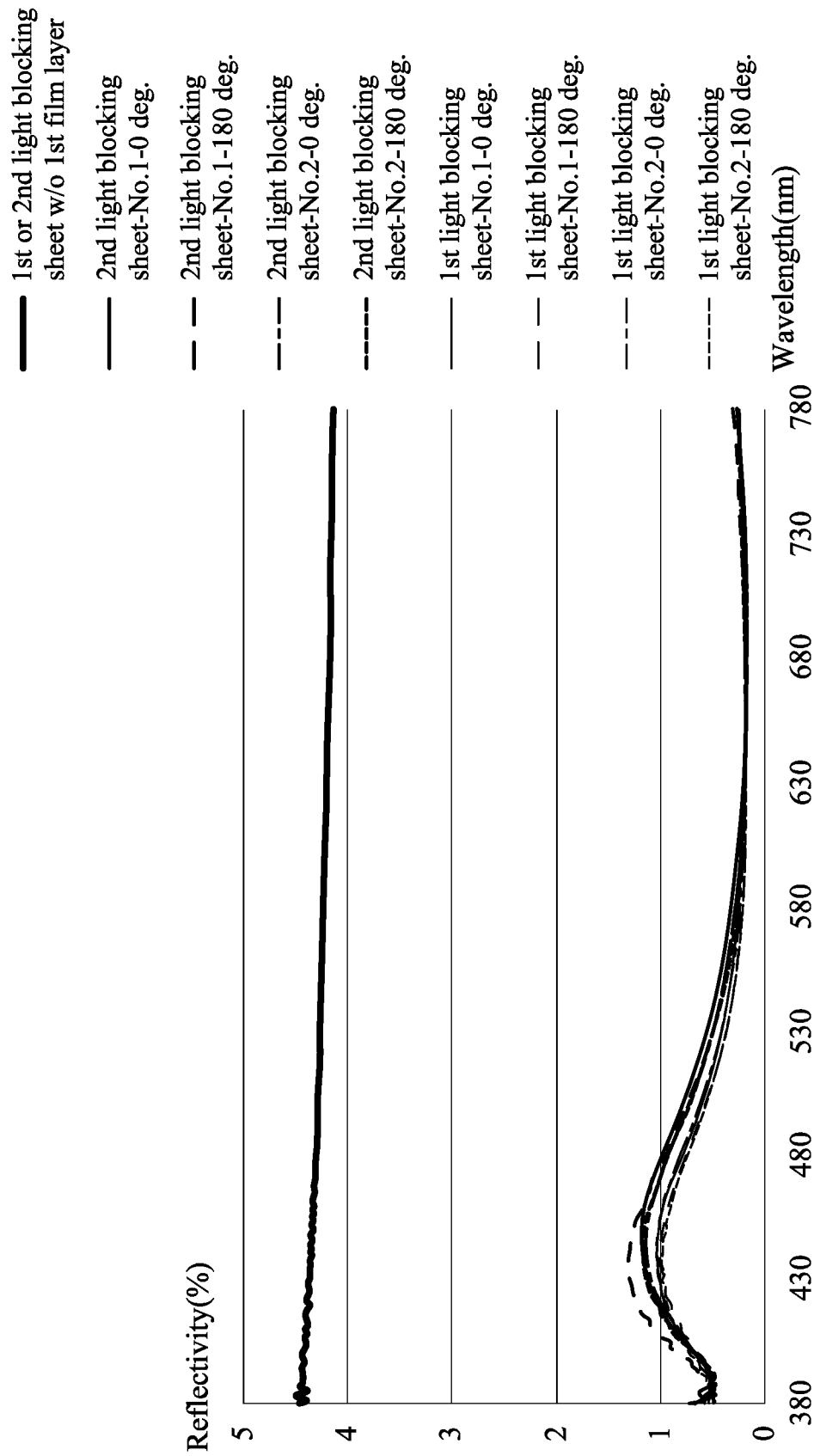
Figure 1H:
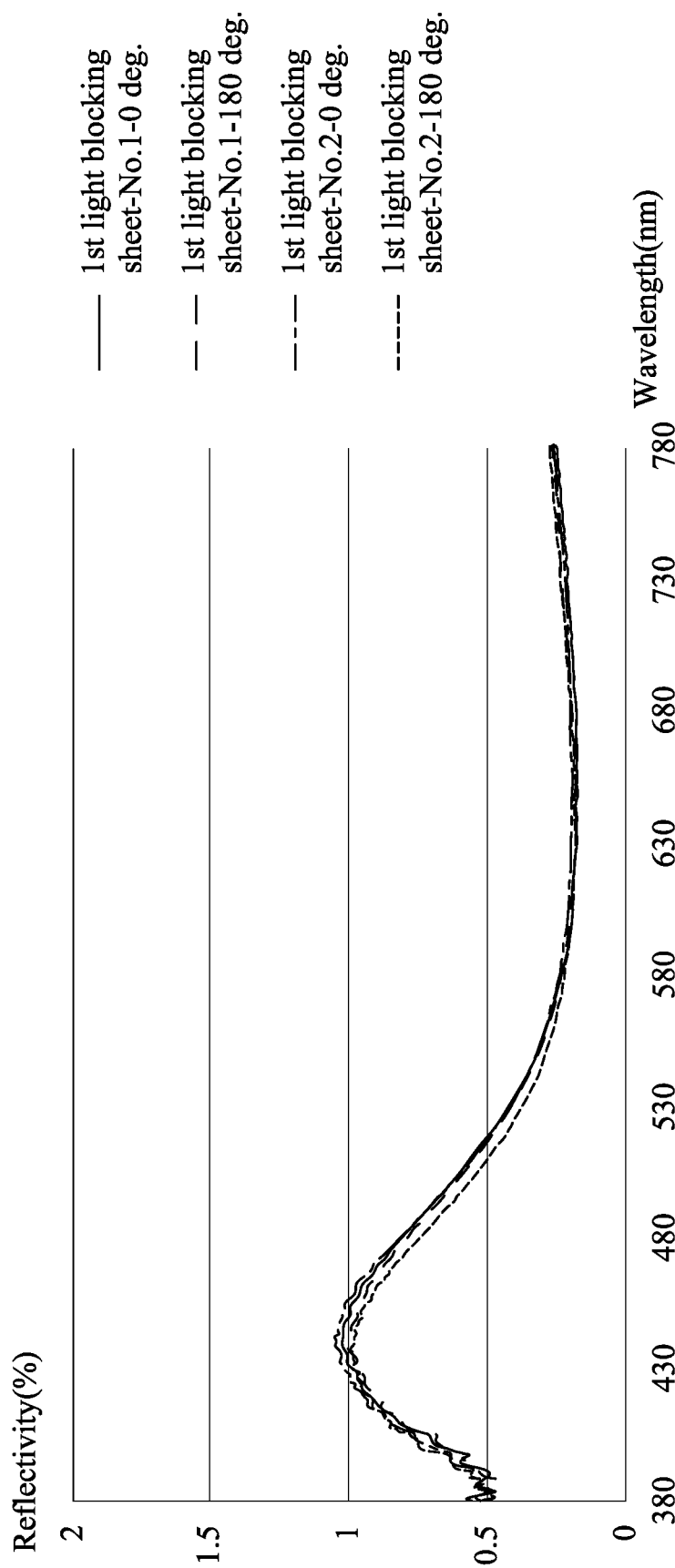
Figure 1I:
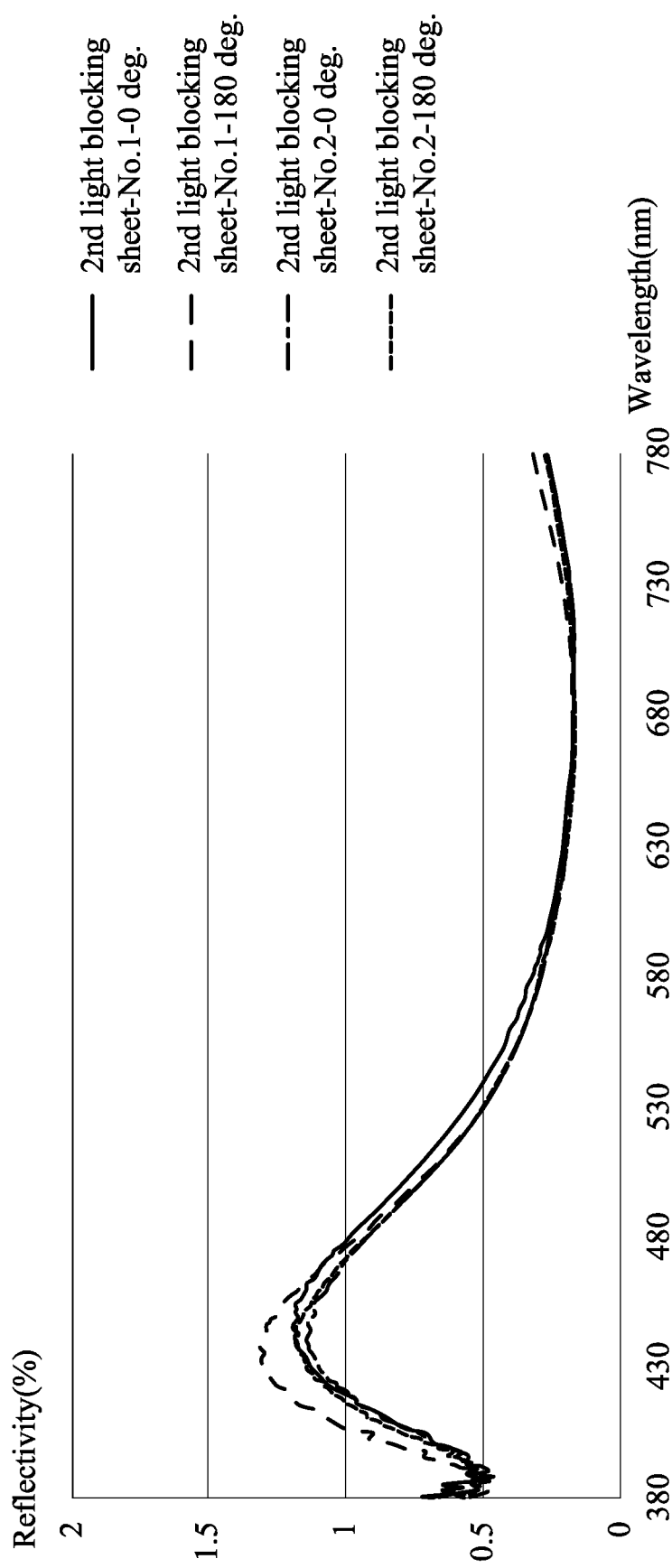

FIG. 1G is a schematic view of reflectivity of the first light blocking sheet 140 and the second light blocking sheet 150 of the optical lens assembly 100 in FIG. 1A, FIG. 1H is a schematic view of the reflectivity of the first light blocking sheet 140 of the optical lens assembly 100 in FIG. 1A, FIG. 1I is a schematic view of the reflectivity of the second light blocking sheet 150 of the optical lens assembly 100 in FIG. 1A, the first film layer 149 is disposed on the object-side surface 145 of the first light blocking sheet 140, and the first film layer 159 is disposed on the object-side surface 155 of the second light blocking sheet 150. With reference to FIG. 1G to FIG. 1I and further to Table 1.1, Table 1.2, Table 1.3 and Table 1.4 as the following, Table 1.1 to Table 1.4 list parameter values of the optical lens assembly 100 and the first film layers 149, 159 of the first light blocking sheet 140 and the second light blocking sheet 150, respectively, thereof in the 1st embodiment of the present disclosure. In Table 1.1 to Table 1.4, the term "A" indicates the wavelength, the term "W/o film layer" indicates the first light blocking sheet 140 without (or not yet having) the first film layer 149 or the second light blocking sheet 150 without (or not yet having) the first film layer 159, the terms "No. 1" and "No. 2" indicate the first light blocking sheet 140 having one of the different first film layers 149 of No. 1 and No. 2 and the second light blocking sheet 150 having one of the different film layers 159 of No. 1 and No. 2, the term "0 deg." indicates that a measurement point of 0 degrees is measured on the first film layer 149 of the first light blocking sheet 140 or on the first film layer 159 of the second light blocking sheet 150, the term "180 deg." indicates that a measurement point of 180 degrees is measured on the first film layer 149 of the first light blocking sheet 140 or on the first film layer 159 of the second light blocking sheet 150, and the measurement point of 180 degrees is rotated with 180 degrees from the measurement point of 0 degrees with respect to the optical axis z (i.e., a central axis of the first light blocking sheet 140 or the second light blocking sheet 150). In addition, it is noted that the parameter values of the first film layers 149, 159 of the first light blocking sheet 140 and the second light blocking sheet 150, respectively, in Table 1.1 to Table 1.3 may be also applicable to the optical lens assembly 300 of the 3rd embodiment, and any one of the first film layers 149, 159 of the first light blocking sheet 140 and the second light blocking sheet 150, respectively, in Table 1.1 to Table 1.3 may be also applicable to any of a first film layer, a second film layer and a third film layer of an optical lens assembly in each embodiment of the present disclosure.

In detail, with reference to the following Table 1.1, Table 1.1 lists the reflectivity values of the first film layers 149, 159 of the first light blocking sheet 140 and the second light blocking sheet 150, respectively, of the optical lens assembly 100 in the 1st embodiment of the present disclosure. In Table 1.1, the unit of the reflectivity value is %, the maximum reflectivity of each the first film layer in Table 1.1 is marked by the symbol "#" in the right side of the reflectivity value, and wavelengths corresponding to all the maximum reflectivity of the first film layers in Table 1.1 are in a wavelength range of 437 nm to 446 nm. The relationship diagrams between the wavelengths and the corresponding reflectivity values listed in Table 1.1 are shown in FIG. 1G to FIG. 1I.

With reference to the following Table 1.2 and Table 1.3, a reflected light is obtained from one of the first film layers 149, 159 irradiated by a standard illuminant D65, a color index of the reflected light is defined according to a CIE 1976 L*a*b* color space, the color index is CI, the reflected light has a maximum reflectivity in a spectrum in a wavelength range of 380 nm to 780 nm, a wavelength range of a wavelength corresponding to the maximum reflectivity minus 50 nm to the wavelength corresponding to the maximum reflectivity plus 50 nm is a high reflectivity section, and a wavelength range remained in a wavelength range of 380 nm to 780 nm excluding the high reflectivity section is a second reflectivity section. An average reflectivity in the high reflectivity section is $R_{high}$, an average reflectivity in the second reflectivity section is $R_2$, the wavelength corresponding to the maximum reflectivity is $\lambda_{RMax}$, the maximum reflectivity is $R_{Max}$, and an average reflectivity of the reflected light in the wavelength range of 380 nm to 780 nm is $R_{3878}$. A difference appears between two color indexes of two points, respectively, on one of the first film layers 149, 159, and an absolute value of the difference is $|\Delta CI|$. The following Table 1.2 and Table 1.3 list the parameter values according to the aforementioned definitions of the optical lens assembly 100 in the 1st embodiment.

With reference to the following Table 1.4, a maximum field of view of the optical lens assembly 100 is FOV. In a direction along the optical axis z, a distance between a most object-side end 115 of the lens barrel 110 and a most image-side end 116 of the lens barrel 110 is Db, a distance between the most object-side end 115 of the lens barrel 110 and the first film layer 149 is Ds1, and a distance between the most object-side end 115 of the lens barrel 110 and the first film layer 159 is Ds2. A diameter of the light entering hole 111 is φb, a diameter of the light passing hole 141 is φs1, and a diameter of the light passing hole 151 is φs2. A thickness in the direction along the optical axis z of the first light blocking sheet 140 is Ts1, and a thickness in the direction along the optical axis z of the second light blocking sheet 150 is Ts2. The following Table 1.4 lists the parameter values according to the aforementioned definitions of the optical lens assembly 100 in the 1st embodiment.

TABLE 1.1

| λ (nm) | W/o film layer | 1st light blocking sheet-No. 1-0 deg. | 1st light blocking sheet-No. 1-180 deg. | 1st light blocking sheet-No. 2-0 deg. | 1st light blocking sheet-No. 2-180 deg. | 2nd light blocking sheet-No. 1-0 deg. | 2nd light blocking sheet-No. 1-180 deg. | 2nd light blocking sheet-No. 2-0 deg. | 2nd light blocking sheet-No. 2-180 deg. |
|---|---|---|---|---|---|---|---|---|---|
| 380 | 4.4778 | 0.5773 | 0.5121 | 0.5215 | 0.5027 | 0.7355 | 0.5680 | 0.6703 | 0.5680 |
| 381 | 4.3826 | 0.5591 | 0.4703 | 0.5636 | 0.4703 | 0.6661 | 0.5124 | 0.6148 | 0.6103 |
| 382 | 4.4438 | 0.4810 | 0.5125 | 0.5125 | 0.4959 | 0.6087 | 0.4810 | 0.5440 | 0.5291 |
| 383 | 4.4978 | 0.5080 | 0.5080 | 0.4806 | 0.5173 | 0.6533 | 0.4806 | 0.5353 | 0.5260 |
| 384 | 4.4716 | 0.4725 | 0.5089 | 0.5029 | 0.4784 | 0.5692 | 0.5029 | 0.5149 | 0.5089 |
| 385 | 4.3868 | 0.5450 | 0.5450 | 0.5106 | 0.5450 | 0.6527 | 0.5106 | 0.5450 | 0.5404 |
| 386 | 4.4192 | 0.5420 | 0.5009 | 0.5283 | 0.5283 | 0.5650 | 0.5283 | 0.5146 | 0.4778 |
| 387 | 4.4608 | 0.5314 | 0.4712 | 0.5403 | 0.5186 | 0.5314 | 0.5403 | 0.5057 | 0.4929 |
| 388 | 4.4228 | 0.4894 | 0.4568 | 0.5221 | 0.5184 | 0.5184 | 0.5221 | 0.4894 | 0.4605 |
| 389 | 4.4394 | 0.5144 | 0.5144 | 0.5490 | 0.5706 | 0.5187 | 0.5706 | 0.5619 | 0.5447 |
| 390 | 4.4230 | 0.4889 | 0.5004 | 0.5464 | 0.5521 | 0.5177 | 0.5292 | 0.4831 | 0.5292 |
| 391 | 4.4369 | 0.5176 | 0.5270 | 0.5543 | 0.5910 | 0.5449 | 0.5722 | 0.4912 | 0.5185 |
| 392 | 4.4336 | 0.5646 | 0.5410 | 0.5669 | 0.6164 | 0.5432 | 0.5927 | 0.5129 | 0.5151 |
| 393 | 4.4346 | 0.5718 | 0.5593 | 0.5921 | 0.6166 | 0.5634 | 0.6573 | 0.5186 | 0.5634 |
| 394 | 4.4409 | 0.6048 | 0.5546 | 0.6148 | 0.6282 | 0.5580 | 0.6681 | 0.5546 | 0.5780 |
| 395 | 4.4245 | 0.6000 | 0.5626 | 0.6222 | 0.6222 | 0.5556 | 0.6959 | 0.5778 | 0.5848 |
| 396 | 4.4218 | 0.5751 | 0.5926 | 0.6365 | 0.6365 | 0.5526 | 0.7204 | 0.5939 | 0.6339 |
| 397 | 4.4191 | 0.5928 | 0.5640 | 0.6337 | 0.6582 | 0.5724 | 0.7071 | 0.5764 | 0.6049 |
| 398 | 4.4254 | 0.5957 | 0.6065 | 0.6439 | 0.6831 | 0.5939 | 0.7616 | 0.5957 | 0.6457 |
| 399 | 4.4329 | 0.6316 | 0.6316 | 0.6615 | 0.7127 | 0.6103 | 0.7883 | 0.6182 | 0.6694 |
| 400 | 4.4297 | 0.6707 | 0.6531 | 0.6888 | 0.7258 | 0.6695 | 0.8336 | 0.6349 | 0.6718 |
| 401 | 4.4130 | 0.6989 | 0.6718 | 0.7281 | 0.7513 | 0.6718 | 0.8679 | 0.6853 | 0.7203 |
| 402 | 4.4156 | 0.7001 | 0.6758 | 0.7434 | 0.7427 | 0.6839 | 0.8947 | 0.6920 | 0.7258 |
| 403 | 4.4046 | 0.7030 | 0.6901 | 0.7555 | 0.7477 | 0.6944 | 0.9190 | 0.7107 | 0.7555 |
| 404 | 4.4023 | 0.7100 | 0.6786 | 0.7574 | 0.7730 | 0.6943 | 0.8995 | 0.7258 | 0.7731 |
| 405 | 4.4002 | 0.7161 | 0.7123 | 0.7659 | 0.7813 | 0.7315 | 0.9459 | 0.7353 | 0.8081 |
| 406 | 4.4055 | 0.7467 | 0.7470 | 0.7909 | 0.8206 | 0.7615 | 0.9760 | 0.7688 | 0.8279 |
| 407 | 4.4101 | 0.7771 | 0.7695 | 0.8167 | 0.8268 | 0.7914 | 1.0061 | 0.7805 | 0.8487 |
| 408 | 4.3940 | 0.8016 | 0.8013 | 0.8295 | 0.8560 | 0.8154 | 1.0367 | 0.8019 | 0.8704 |
| 409 | 4.4051 | 0.8176 | 0.8004 | 0.8541 | 0.8385 | 0.8273 | 1.0557 | 0.8347 | 0.8788 |
| 410 | 4.4026 | 0.8314 | 0.8054 | 0.8643 | 0.8564 | 0.8453 | 1.0728 | 0.8573 | 0.9092 |
| 411 | 4.3902 | 0.8349 | 0.7999 | 0.8626 | 0.8673 | 0.8600 | 1.0857 | 0.8798 | 0.9300 |
| 412 | 4.3978 | 0.8293 | 0.8165 | 0.8768 | 0.8658 | 0.8774 | 1.1080 | 0.8779 | 0.9266 |
| 413 | 4.3919 | 0.8482 | 0.8318 | 0.8754 | 0.8836 | 0.8908 | 1.1067 | 0.8954 | 0.9462 |
| 414 | 4.3881 | 0.8638 | 0.8510 | 0.8916 | 0.8916 | 0.9144 | 1.1313 | 0.9094 | 0.9665 |
| 415 | 4.3908 | 0.8860 | 0.8729 | 0.9081 | 0.9171 | 0.9482 | 1.1669 | 0.9301 | 0.9853 |
| 416 | 4.3887 | 0.8956 | 0.8741 | 0.9370 | 0.9072 | 0.9602 | 1.1770 | 0.9594 | 1.0032 |
| 417 | 4.3865 | 0.9030 | 0.8787 | 0.9308 | 0.9169 | 0.9655 | 1.1948 | 0.9620 | 1.0072 |
| 418 | 4.3785 | 0.9032 | 0.8788 | 0.9318 | 0.9092 | 0.9699 | 1.1987 | 0.9741 | 1.0164 |
| 419 | 4.3725 | 0.9169 | 0.8973 | 0.9449 | 0.9267 | 1.0023 | 1.2115 | 0.9940 | 1.0348 |
| 420 | 4.3727 | 0.9153 | 0.8894 | 0.9441 | 0.9345 | 1.0037 | 1.2053 | 0.9921 | 1.0507 |
| 421 | 4.3877 | 0.9326 | 0.9192 | 0.9573 | 0.9479 | 1.0287 | 1.2249 | 1.0040 | 1.0661 |
| 422 | 4.3800 | 0.9520 | 0.9267 | 0.9647 | 0.9612 | 1.0511 | 1.2429 | 1.0216 | 1.0708 |
| 423 | 4.3824 | 0.9686 | 0.9352 | 0.9853 | 0.9620 | 1.0680 | 1.2554 | 1.0400 | 1.0925 |
| 424 | 4.3717 | 0.9656 | 0.9394 | 0.9789 | 0.9493 | 1.0719 | 1.2646 | 1.0391 | 1.0840 |
| 425 | 4.3657 | 0.9692 | 0.9435 | 1.0054 | 0.9574 | 1.0806 | 1.2723 | 1.0601 | 1.1082 |
| 426 | 4.3693 | 0.9733 | 0.9426 | 1.0039 | 0.9619 | 1.0881 | 1.2763 | 1.0737 | 1.1212 |

TABLE 1.1-continued

| λ (nm) | W/o film layer | 1st light blocking sheet-No. 1-0 deg. | 1st light blocking sheet-No. 1-180 deg. | 1st light blocking sheet-No. 2-0 deg. | 1st light blocking sheet-No. 2-180 deg. | 2nd light blocking sheet-No. 1-0 deg. | 2nd light blocking sheet-No. 1-180 deg. | 2nd light blocking sheet-No. 2-0 deg. | 2nd light blocking sheet-No. 2-180 deg. |
|---|---|---|---|---|---|---|---|---|---|
| 427 | 4.3676 | 0.9772 | 0.9440 | 0.9955 | 0.9689 | 1.1008 | 1.2833 | 1.0701 | 1.1199 |
| 428 | 4.3741 | 0.9713 | 0.9536 | 1.0083 | 0.9631 | 1.1090 | 1.2807 | 1.0832 | 1.1322 |
| 429 | 4.3691 | 0.9921 | 0.9679 | 1.0116 | 0.9841 | 1.1245 | 1.2906 | 1.0923 | 1.1407 |
| 430 | 4.3628 | 1.0005 | 0.9766 | 1.0244 | 0.9926 | 1.1359 | 1.3004 | 1.0987 | 1.1518 |
| 431 | 4.3686 | 1.0054 | 0.9743 | 1.0218 | 0.9828 | 1.1399 | 1.3062 | 1.1077 | 1.1411 |
| 432 | 4.3598 | 1.0085 | 0.9693 | 1.0356 | 0.9821 | 1.1404 | 1.3130 | 1.1105 | 1.1561 |
| 433 | 4.3583 | 1.0087 | 0.9732 | 1.0301 | 0.9801 | 1.1434 | 1.3077 | 1.1166 | 1.1590 |
| 434 | 4.3568 | 1.0035 | 0.9780 | 1.0313 | 0.9881 | 1.1555 | 1.3097 | 1.1192 | 1.1601 |
| 435 | 4.3628 | 1.0081 | 0.9776 | 1.0311 | 0.9780 | 1.1546 | 1.3012 | 1.1235 | 1.1693 |
| 436 | 4.3601 | 1.0154 | 0.9880 | 1.0355 | 0.9940 | 1.1699 | 1.3075 | 1.1272 | 1.1715 |
| 437 | 4.3596 | 1.0151 | 0.9894 | 1.0426 | 0.9964 # | 1.1749 | 1.3119 | 1.1340 | 1.1720 |
| 438 | 4.3664 | 1.0293 # | 1.0022 # | 1.0445 | 0.9903 | 1.1778 | 1.3143 # | 1.1409 | 1.1788 |
| 439 | 4.3504 | 1.0255 | 0.9883 | 1.0551 # | 0.9875 | 1.1833 | 1.3117 | 1.1386 | 1.1763 |
| 440 | 4.3502 | 1.0241 | 0.9966 | 1.0466 | 0.9789 | 1.1819 | 1.3097 | 1.1486 # | 1.1819 |
| 441 | 4.3547 | 1.0252 | 0.9873 | 1.0476 | 0.9803 | 1.1823 | 1.3060 | 1.1444 | 1.1823 |
| 442 | 4.3480 | 1.0205 | 0.9907 | 1.0535 | 0.9811 | 1.1876 | 1.3014 | 1.1417 | 1.1823 |
| 443 | 4.3518 | 1.0175 | 0.9878 | 1.0330 | 0.9731 | 1.1811 | 1.2925 | 1.1363 | 1.1737 |
| 444 | 4.3490 | 1.0159 | 0.9937 | 1.0422 | 0.9789 | 1.1919 | 1.2939 | 1.1327 | 1.1829 # |
| 445 | 4.3454 | 1.0200 | 0.9944 | 1.0382 | 0.9796 | 1.1894 | 1.2886 | 1.1340 | 1.1782 |
| 446 | 4.3373 | 1.0189 | 0.9895 | 1.0408 | 0.9749 | 1.1928 # | 1.2901 | 1.1361 | 1.1748 |
| 447 | 4.3464 | 1.0226 | 0.9934 | 1.0374 | 0.9645 | 1.1908 | 1.2786 | 1.1395 | 1.1689 |
| 448 | 4.3437 | 1.0106 | 0.9798 | 1.0363 | 0.9636 | 1.1834 | 1.2801 | 1.1286 | 1.1632 |
| 449 | 4.3403 | 1.0039 | 0.9748 | 1.0288 | 0.9566 | 1.1805 | 1.2600 | 1.1267 | 1.1591 |
| 450 | 4.3321 | 0.9986 | 0.9718 | 1.0240 | 0.9469 | 1.1749 | 1.2486 | 1.1155 | 1.1567 |
| 451 | 4.3412 | 0.9942 | 0.9726 | 1.0298 | 0.9581 | 1.1870 | 1.2515 | 1.1157 | 1.1516 |
| 452 | 4.3401 | 0.9962 | 0.9803 | 1.0138 | 0.9519 | 1.1826 | 1.2465 | 1.1207 | 1.1491 |
| 453 | 4.3353 | 0.9974 | 0.9763 | 1.0222 | 0.9481 | 1.1878 | 1.2443 | 1.1171 | 1.1384 |
| 454 | 4.3356 | 0.9974 | 0.9713 | 1.0184 | 0.9434 | 1.1861 | 1.2350 | 1.1129 | 1.1320 |
| 455 | 4.3361 | 0.9937 | 0.9590 | 1.0146 | 0.9381 | 1.1744 | 1.2300 | 1.1118 | 1.1326 |
| 456 | 4.3243 | 0.9768 | 0.9493 | 1.0060 | 0.9184 | 1.1656 | 1.2120 | 1.1021 | 1.1227 |
| 457 | 4.3334 | 0.9721 | 0.9449 | 0.9959 | 0.9211 | 1.1624 | 1.2032 | 1.0978 | 1.1216 |
| 458 | 4.3371 | 0.9573 | 0.9354 | 0.9808 | 0.9135 | 1.1541 | 1.1945 | 1.0784 | 1.1053 |
| 459 | 4.3240 | 0.9682 | 0.9417 | 0.9815 | 0.9086 | 1.1539 | 1.1805 | 1.0810 | 1.1075 |
| 460 | 4.3325 | 0.9521 | 0.9324 | 0.9733 | 0.9029 | 1.1471 | 1.1733 | 1.0701 | 1.0881 |
| 461 | 4.3279 | 0.9610 | 0.9351 | 0.9739 | 0.9029 | 1.1513 | 1.1771 | 1.0738 | 1.0900 |
| 462 | 4.3280 | 0.9527 | 0.9257 | 0.9718 | 0.8907 | 1.1436 | 1.1642 | 1.0657 | 1.0800 |
| 463 | 4.3250 | 0.9388 | 0.9137 | 0.9638 | 0.8763 | 1.1266 | 1.1578 | 1.0577 | 1.0703 |
| 464 | 4.3220 | 0.9279 | 0.9004 | 0.9525 | 0.8742 | 1.1170 | 1.1384 | 1.0478 | 1.0647 |
| 465 | 4.3162 | 0.9138 | 0.8957 | 0.9410 | 0.8656 | 1.1128 | 1.1249 | 1.0405 | 1.0556 |
| 466 | 4.3194 | 0.9127 | 0.8905 | 0.9333 | 0.8564 | 1.1079 | 1.1107 | 1.0279 | 1.0502 |
| 467 | 4.3252 | 0.9056 | 0.8881 | 0.9287 | 0.8589 | 1.1030 | 1.1029 | 1.0217 | 1.0391 |
| 468 | 4.3206 | 0.9034 | 0.8792 | 0.9163 | 0.8409 | 1.0965 | 1.0924 | 1.0170 | 1.0325 |
| 469 | 4.3167 | 0.9037 | 0.8760 | 0.9174 | 0.8398 | 1.0921 | 1.0893 | 1.0145 | 1.0256 |
| 470 | 4.3121 | 0.8926 | 0.8655 | 0.9076 | 0.8276 | 1.0809 | 1.0755 | 1.0051 | 1.0159 |
| 471 | 4.3137 | 0.8733 | 0.8520 | 0.8943 | 0.8151 | 1.0639 | 1.0584 | 1.0053 | 1.0108 |
| 472 | 4.3145 | 0.8680 | 0.8437 | 0.8849 | 0.8113 | 1.0589 | 1.0486 | 0.9895 | 1.0036 |
| 473 | 4.3137 | 0.8576 | 0.8375 | 0.8751 | 0.7997 | 1.0489 | 1.0309 | 0.9806 | 0.9907 |
| 474 | 4.3115 | 0.8524 | 0.8405 | 0.8747 | 0.7975 | 1.0507 | 1.0225 | 0.9774 | 0.9909 |
| 475 | 4.3173 | 0.8480 | 0.8289 | 0.8576 | 0.7861 | 1.0432 | 1.0099 | 0.9625 | 0.9766 |
| 476 | 4.3112 | 0.8375 | 0.8190 | 0.8501 | 0.7760 | 1.0274 | 0.9950 | 0.9566 | 0.9626 |
| 477 | 4.3072 | 0.8307 | 0.8103 | 0.8421 | 0.7677 | 1.0152 | 0.9861 | 0.9456 | 0.9522 |
| 478 | 4.3072 | 0.8229 | 0.8011 | 0.8326 | 0.7549 | 1.0021 | 0.9724 | 0.9365 | 0.9409 |
| 479 | 4.3067 | 0.8083 | 0.7875 | 0.8252 | 0.7488 | 0.9956 | 0.9655 | 0.9274 | 0.9318 |
| 480 | 4.3052 | 0.7993 | 0.7887 | 0.8105 | 0.7391 | 0.9863 | 0.9480 | 0.9137 | 0.9232 |
| 481 | 4.3016 | 0.7908 | 0.7769 | 0.8010 | 0.7288 | 0.9731 | 0.9352 | 0.9012 | 0.9133 |
| 482 | 4.3046 | 0.7884 | 0.7736 | 0.7908 | 0.7237 | 0.9701 | 0.9319 | 0.8945 | 0.9031 |
| 483 | 4.3011 | 0.7749 | 0.7671 | 0.7861 | 0.7176 | 0.9574 | 0.9157 | 0.8850 | 0.8960 |
| 484 | 4.3033 | 0.7683 | 0.7572 | 0.7768 | 0.7053 | 0.9511 | 0.9137 | 0.8778 | 0.8815 |
| 485 | 4.2999 | 0.7617 | 0.7489 | 0.7686 | 0.6965 | 0.9388 | 0.9040 | 0.8696 | 0.8732 |
| 486 | 4.3055 | 0.7480 | 0.7367 | 0.7600 | 0.6867 | 0.9271 | 0.8940 | 0.8587 | 0.8650 |
| 487 | 4.2991 | 0.7422 | 0.7287 | 0.7493 | 0.6805 | 0.9176 | 0.8833 | 0.8489 | 0.8527 |
| 488 | 4.2999 | 0.7281 | 0.7200 | 0.7381 | 0.6709 | 0.9049 | 0.8702 | 0.8366 | 0.8457 |
| 489 | 4.2994 | 0.7247 | 0.7159 | 0.7309 | 0.6634 | 0.9001 | 0.8622 | 0.8312 | 0.8359 |
| 490 | 4.2978 | 0.7137 | 0.7087 | 0.7221 | 0.6573 | 0.8892 | 0.8480 | 0.8165 | 0.8249 |
| 491 | 4.2943 | 0.7150 | 0.7026 | 0.7154 | 0.6462 | 0.8816 | 0.8465 | 0.8126 | 0.8159 |
| 492 | 4.2969 | 0.7010 | 0.6918 | 0.7053 | 0.6356 | 0.8708 | 0.8288 | 0.8023 | 0.8085 |
| 493 | 4.2931 | 0.6920 | 0.6813 | 0.6937 | 0.6260 | 0.8600 | 0.8176 | 0.7927 | 0.7970 |
| 494 | 4.2908 | 0.6790 | 0.6697 | 0.6843 | 0.6144 | 0.8483 | 0.8042 | 0.7813 | 0.7842 |
| 495 | 4.2946 | 0.6747 | 0.6636 | 0.6802 | 0.6144 | 0.8416 | 0.7928 | 0.7750 | 0.7783 |
| 496 | 4.2906 | 0.6619 | 0.6544 | 0.6638 | 0.6019 | 0.8306 | 0.7819 | 0.7584 | 0.7659 |
| 497 | 4.2925 | 0.6563 | 0.6500 | 0.6563 | 0.5958 | 0.8261 | 0.7718 | 0.7526 | 0.7565 |
| 498 | 4.2913 | 0.6500 | 0.6429 | 0.6478 | 0.5886 | 0.8152 | 0.7653 | 0.7442 | 0.7491 |
| 499 | 4.2871 | 0.6426 | 0.6367 | 0.6448 | 0.5792 | 0.8106 | 0.7557 | 0.7373 | 0.7371 |
| 500 | 4.2892 | 0.6354 | 0.6250 | 0.6345 | 0.5718 | 0.7979 | 0.7472 | 0.7291 | 0.7274 |

TABLE 1.1-continued

| λ (nm) | W/o film layer | 1st light blocking sheet-No. 1-0 deg. | 1st light blocking sheet-No. 1-180 deg. | 1st light blocking sheet-No. 2-0 deg. | 1st light blocking sheet-No. 2-180 deg. | 2nd light blocking sheet-No. 1-0 deg. | 2nd light blocking sheet-No. 1-180 deg. | 2nd light blocking sheet-No. 2-0 deg. | 2nd light blocking sheet-No. 2-180 deg. |
|---|---|---|---|---|---|---|---|---|---|
| 501 | 4.2867 | 0.6250 | 0.6171 | 0.6261 | 0.5615 | 0.7877 | 0.7376 | 0.7199 | 0.7184 |
| 502 | 4.2834 | 0.6147 | 0.6069 | 0.6168 | 0.5566 | 0.7769 | 0.7259 | 0.7106 | 0.7102 |
| 503 | 4.2846 | 0.6060 | 0.5985 | 0.6034 | 0.5432 | 0.7658 | 0.7146 | 0.7002 | 0.6980 |
| 504 | 4.2850 | 0.6011 | 0.5932 | 0.5971 | 0.5410 | 0.7593 | 0.7047 | 0.6913 | 0.6913 |
| 505 | 4.2856 | 0.5934 | 0.5860 | 0.5883 | 0.5329 | 0.7529 | 0.6967 | 0.6817 | 0.6817 |
| 506 | 4.2815 | 0.5868 | 0.5796 | 0.5819 | 0.5238 | 0.7458 | 0.6889 | 0.6733 | 0.6733 |
| 507 | 4.2821 | 0.5822 | 0.5712 | 0.5736 | 0.5174 | 0.7371 | 0.6790 | 0.6673 | 0.6652 |
| 508 | 4.2804 | 0.5721 | 0.5626 | 0.5677 | 0.5106 | 0.7281 | 0.6732 | 0.6578 | 0.6571 |
| 509 | 4.2795 | 0.5622 | 0.5540 | 0.5604 | 0.5019 | 0.7177 | 0.6626 | 0.6505 | 0.6484 |
| 510 | 4.2802 | 0.5565 | 0.5484 | 0.5512 | 0.4956 | 0.7089 | 0.6540 | 0.6431 | 0.6428 |
| 511 | 4.2796 | 0.5448 | 0.5387 | 0.5404 | 0.4864 | 0.7006 | 0.6385 | 0.6302 | 0.6324 |
| 512 | 4.2773 | 0.5408 | 0.5353 | 0.5339 | 0.4815 | 0.6940 | 0.6333 | 0.6252 | 0.6292 |
| 513 | 4.2751 | 0.5335 | 0.5267 | 0.5267 | 0.4740 | 0.6855 | 0.6256 | 0.6163 | 0.6191 |
| 514 | 4.2758 | 0.5300 | 0.5208 | 0.5224 | 0.4691 | 0.6801 | 0.6195 | 0.6113 | 0.6116 |
| 515 | 4.2722 | 0.5192 | 0.5110 | 0.5131 | 0.4587 | 0.6690 | 0.6103 | 0.6010 | 0.6030 |
| 516 | 4.2768 | 0.5127 | 0.5025 | 0.5063 | 0.4520 | 0.6621 | 0.6021 | 0.5957 | 0.5969 |
| 517 | 4.2744 | 0.5048 | 0.4961 | 0.4987 | 0.4452 | 0.6508 | 0.5942 | 0.5889 | 0.5889 |
| 518 | 4.2757 | 0.4954 | 0.4893 | 0.4911 | 0.4390 | 0.6434 | 0.5860 | 0.5807 | 0.5807 |
| 519 | 4.2735 | 0.4901 | 0.4828 | 0.4812 | 0.4334 | 0.6371 | 0.5747 | 0.5743 | 0.5762 |
| 520 | 4.2744 | 0.4846 | 0.4780 | 0.4774 | 0.4296 | 0.6313 | 0.5697 | 0.5668 | 0.5679 |
| 521 | 4.2733 | 0.4789 | 0.4724 | 0.4706 | 0.4234 | 0.6249 | 0.5619 | 0.5601 | 0.5601 |
| 522 | 4.2691 | 0.4708 | 0.4638 | 0.4635 | 0.4130 | 0.6143 | 0.5552 | 0.5535 | 0.5535 |
| 523 | 4.2711 | 0.4665 | 0.4564 | 0.4582 | 0.4106 | 0.6081 | 0.5473 | 0.5458 | 0.5455 |
| 524 | 4.2704 | 0.4593 | 0.4511 | 0.4528 | 0.4033 | 0.5999 | 0.5410 | 0.5410 | 0.5399 |
| 525 | 4.2694 | 0.4515 | 0.4444 | 0.4461 | 0.3971 | 0.5939 | 0.5323 | 0.5334 | 0.5344 |
| 526 | 4.2683 | 0.4413 | 0.4347 | 0.4364 | 0.3902 | 0.5866 | 0.5212 | 0.5228 | 0.5245 |
| 527 | 4.2686 | 0.4390 | 0.4323 | 0.4321 | 0.3885 | 0.5803 | 0.5160 | 0.5197 | 0.5212 |
| 528 | 4.2675 | 0.4328 | 0.4255 | 0.4245 | 0.3806 | 0.5745 | 0.5076 | 0.5130 | 0.5123 |
| 529 | 4.2665 | 0.4277 | 0.4205 | 0.4205 | 0.3750 | 0.5680 | 0.5028 | 0.5071 | 0.5065 |
| 530 | 4.2644 | 0.4214 | 0.4134 | 0.4149 | 0.3706 | 0.5604 | 0.4965 | 0.5000 | 0.4971 |
| 531 | 4.2666 | 0.4154 | 0.4087 | 0.4103 | 0.3652 | 0.5532 | 0.4915 | 0.4961 | 0.4961 |
| 532 | 4.2655 | 0.4076 | 0.4008 | 0.4024 | 0.3584 | 0.5452 | 0.4838 | 0.4882 | 0.4876 |
| 533 | 4.2646 | 0.4015 | 0.3947 | 0.3973 | 0.3536 | 0.5381 | 0.4770 | 0.4814 | 0.4808 |
| 534 | 4.2640 | 0.3960 | 0.3923 | 0.3926 | 0.3499 | 0.5322 | 0.4746 | 0.4778 | 0.4778 |
| 535 | 4.2633 | 0.3927 | 0.3866 | 0.3853 | 0.3471 | 0.5277 | 0.4671 | 0.4700 | 0.4716 |
| 536 | 4.2631 | 0.3868 | 0.3815 | 0.3821 | 0.3415 | 0.5202 | 0.4633 | 0.4643 | 0.4659 |
| 537 | 4.2622 | 0.3827 | 0.3755 | 0.3781 | 0.3367 | 0.5124 | 0.4599 | 0.4589 | 0.4594 |
| 538 | 4.2595 | 0.3758 | 0.3709 | 0.3726 | 0.3295 | 0.5066 | 0.4531 | 0.4529 | 0.4529 |
| 539 | 4.2574 | 0.3700 | 0.3641 | 0.3671 | 0.3256 | 0.4965 | 0.4497 | 0.4486 | 0.4497 |
| 540 | 4.2593 | 0.3639 | 0.3587 | 0.3623 | 0.3222 | 0.4918 | 0.4425 | 0.4434 | 0.4425 |
| 541 | 4.2575 | 0.3568 | 0.3536 | 0.3572 | 0.3171 | 0.4852 | 0.4360 | 0.4370 | 0.4380 |
| 542 | 4.2590 | 0.3540 | 0.3497 | 0.3528 | 0.3159 | 0.4818 | 0.4303 | 0.4318 | 0.4360 |
| 543 | 4.2573 | 0.3487 | 0.3467 | 0.3469 | 0.3092 | 0.4759 | 0.4245 | 0.4269 | 0.4273 |
| 544 | 4.2567 | 0.3464 | 0.3418 | 0.3439 | 0.3064 | 0.4709 | 0.4215 | 0.4212 | 0.4236 |
| 545 | 4.2562 | 0.3424 | 0.3378 | 0.3418 | 0.3035 | 0.4660 | 0.4166 | 0.4181 | 0.4186 |
| 546 | 4.2552 | 0.3384 | 0.3325 | 0.3357 | 0.3005 | 0.4586 | 0.4127 | 0.4128 | 0.4156 |
| 547 | 4.2533 | 0.3294 | 0.3261 | 0.3307 | 0.2931 | 0.4519 | 0.4051 | 0.4079 | 0.4083 |
| 548 | 4.2535 | 0.3260 | 0.3226 | 0.3272 | 0.2916 | 0.4469 | 0.4006 | 0.4028 | 0.4052 |
| 549 | 4.2531 | 0.3216 | 0.3191 | 0.3227 | 0.2889 | 0.4410 | 0.3955 | 0.3986 | 0.4011 |
| 550 | 4.2515 | 0.3196 | 0.3165 | 0.3209 | 0.2860 | 0.4391 | 0.3906 | 0.3950 | 0.3967 |
| 551 | 4.2531 | 0.3146 | 0.3115 | 0.3160 | 0.2832 | 0.4330 | 0.3867 | 0.3896 | 0.3926 |
| 552 | 4.2490 | 0.3131 | 0.3100 | 0.3131 | 0.2781 | 0.4293 | 0.3834 | 0.3849 | 0.3865 |
| 553 | 4.2494 | 0.3090 | 0.3058 | 0.3108 | 0.2756 | 0.4248 | 0.3797 | 0.3831 | 0.3828 |
| 554 | 4.2489 | 0.3047 | 0.3003 | 0.3078 | 0.2732 | 0.4206 | 0.3765 | 0.3785 | 0.3796 |
| 555 | 4.2511 | 0.2993 | 0.2960 | 0.3010 | 0.2692 | 0.4128 | 0.3685 | 0.3731 | 0.3718 |
| 556 | 4.2473 | 0.2961 | 0.2919 | 0.2993 | 0.2659 | 0.4108 | 0.3643 | 0.3680 | 0.3696 |
| 557 | 4.2462 | 0.2910 | 0.2887 | 0.2951 | 0.2648 | 0.4076 | 0.3588 | 0.3636 | 0.3652 |
| 558 | 4.2436 | 0.2883 | 0.2867 | 0.2918 | 0.2626 | 0.4043 | 0.3571 | 0.3593 | 0.3609 |
| 559 | 4.2462 | 0.2877 | 0.2860 | 0.2908 | 0.2587 | 0.4024 | 0.3539 | 0.3557 | 0.3557 |
| 560 | 4.2436 | 0.2839 | 0.2807 | 0.2865 | 0.2574 | 0.3974 | 0.3486 | 0.3530 | 0.3530 |
| 561 | 4.2427 | 0.2806 | 0.2782 | 0.2856 | 0.2546 | 0.3936 | 0.3471 | 0.3504 | 0.3495 |
| 562 | 4.2412 | 0.2774 | 0.2745 | 0.2824 | 0.2514 | 0.3872 | 0.3415 | 0.3448 | 0.3457 |
| 563 | 4.2410 | 0.2715 | 0.2699 | 0.2781 | 0.2500 | 0.3825 | 0.3378 | 0.3410 | 0.3443 |
| 564 | 4.2410 | 0.2678 | 0.2674 | 0.2732 | 0.2449 | 0.3773 | 0.3336 | 0.3344 | 0.3365 |
| 565 | 4.2400 | 0.2677 | 0.2660 | 0.2719 | 0.2460 | 0.3756 | 0.3305 | 0.3330 | 0.3363 |
| 566 | 4.2415 | 0.2652 | 0.2647 | 0.2706 | 0.2433 | 0.3727 | 0.3286 | 0.3303 | 0.3324 |
| 567 | 4.2373 | 0.2632 | 0.2615 | 0.2682 | 0.2445 | 0.3694 | 0.3273 | 0.3273 | 0.3306 |
| 568 | 4.2380 | 0.2601 | 0.2584 | 0.2669 | 0.2376 | 0.3635 | 0.3219 | 0.3236 | 0.3249 |
| 569 | 4.2370 | 0.2560 | 0.2543 | 0.2636 | 0.2365 | 0.3589 | 0.3198 | 0.3207 | 0.3215 |
| 570 | 4.2361 | 0.2529 | 0.2512 | 0.2602 | 0.2349 | 0.3516 | 0.3160 | 0.3172 | 0.3189 |
| 571 | 4.2335 | 0.2499 | 0.2482 | 0.2567 | 0.2295 | 0.3473 | 0.3099 | 0.3116 | 0.3133 |
| 572 | 4.2359 | 0.2441 | 0.2444 | 0.2527 | 0.2287 | 0.3437 | 0.3070 | 0.3087 | 0.3107 |
| 573 | 4.2348 | 0.2444 | 0.2461 | 0.2538 | 0.2296 | 0.3437 | 0.3063 | 0.3072 | 0.3099 |
| 574 | 4.2329 | 0.2448 | 0.2453 | 0.2516 | 0.2286 | 0.3435 | 0.3053 | 0.3053 | 0.3070 |

TABLE 1.1-continued

| λ (nm) | W/o film layer | 1st light blocking sheet- No. 1- 0 deg. | 1st light blocking sheet- No. 1- 180 deg. | 1st light blocking sheet- No. 2- 0 deg. | 1st light blocking sheet- No. 2- 180 deg. | 2nd light blocking sheet- No. 1- 0 deg. | 2nd light blocking sheet- No. 1- 180 deg. | 2nd light blocking sheet- No. 2- 0 deg. | 2nd light blocking sheet- No. 2- 180 deg. |
|---|---|---|---|---|---|---|---|---|---|
| 575 | 4.2344 | 0.2411 | 0.2411 | 0.2495 | 0.2254 | 0.3382 | 0.3015 | 0.3015 | 0.3049 |
| 576 | 4.2321 | 0.2398 | 0.2381 | 0.2487 | 0.2242 | 0.3361 | 0.2983 | 0.3001 | 0.3006 |
| 577 | 4.2308 | 0.2360 | 0.2343 | 0.2457 | 0.2211 | 0.3296 | 0.2946 | 0.2956 | 0.2977 |
| 578 | 4.2291 | 0.2335 | 0.2340 | 0.2433 | 0.2185 | 0.3273 | 0.2932 | 0.2943 | 0.2966 |
| 579 | 4.2288 | 0.2316 | 0.2318 | 0.2420 | 0.2205 | 0.3240 | 0.2907 | 0.2924 | 0.2959 |
| 580 | 4.2286 | 0.2315 | 0.2300 | 0.2406 | 0.2183 | 0.3234 | 0.2858 | 0.2875 | 0.2940 |
| 581 | 4.2288 | 0.2257 | 0.2263 | 0.2364 | 0.2158 | 0.3179 | 0.2822 | 0.2846 | 0.2880 |
| 582 | 4.2272 | 0.2246 | 0.2253 | 0.2342 | 0.2126 | 0.3126 | 0.2789 | 0.2813 | 0.2848 |
| 583 | 4.2272 | 0.2265 | 0.2280 | 0.2387 | 0.2170 | 0.3174 | 0.2837 | 0.2855 | 0.2890 |
| 584 | 4.2266 | 0.2237 | 0.2237 | 0.2344 | 0.2118 | 0.3086 | 0.2802 | 0.2803 | 0.2839 |
| 585 | 4.2270 | 0.2184 | 0.2178 | 0.2307 | 0.2101 | 0.3035 | 0.2735 | 0.2765 | 0.2800 |
| 586 | 4.2256 | 0.2209 | 0.2202 | 0.2335 | 0.2122 | 0.3065 | 0.2769 | 0.2792 | 0.2839 |
| 587 | 4.2246 | 0.2118 | 0.2146 | 0.2240 | 0.2048 | 0.2942 | 0.2663 | 0.2677 | 0.2744 |
| 588 | 4.2209 | 0.2105 | 0.2123 | 0.2226 | 0.2051 | 0.2937 | 0.2642 | 0.2659 | 0.2713 |
| 589 | 4.2236 | 0.2138 | 0.2168 | 0.2259 | 0.2069 | 0.2953 | 0.2664 | 0.2676 | 0.2740 |
| 590 | 4.2213 | 0.2131 | 0.2148 | 0.2243 | 0.2053 | 0.2933 | 0.2648 | 0.2657 | 0.2699 |
| 591 | 4.2196 | 0.2113 | 0.2116 | 0.2229 | 0.2040 | 0.2889 | 0.2638 | 0.2641 | 0.2662 |
| 592 | 4.2216 | 0.2100 | 0.2100 | 0.2220 | 0.2015 | 0.2868 | 0.2597 | 0.2613 | 0.2647 |
| 593 | 4.2189 | 0.2055 | 0.2059 | 0.2191 | 0.1996 | 0.2806 | 0.2576 | 0.2576 | 0.2615 |
| 594 | 4.2179 | 0.2041 | 0.2058 | 0.2176 | 0.1999 | 0.2783 | 0.2556 | 0.2547 | 0.2598 |
| 595 | 4.2181 | 0.2041 | 0.2057 | 0.2175 | 0.2003 | 0.2787 | 0.2548 | 0.2531 | 0.2594 |
| 596 | 4.2209 | 0.2020 | 0.2036 | 0.2137 | 0.1970 | 0.2737 | 0.2504 | 0.2504 | 0.2554 |
| 597 | 4.2157 | 0.2010 | 0.2043 | 0.2143 | 0.1986 | 0.2744 | 0.2504 | 0.2483 | 0.2520 |
| 598 | 4.2172 | 0.2000 | 0.2026 | 0.2133 | 0.1959 | 0.2694 | 0.2488 | 0.2447 | 0.2488 |
| 599 | 4.2139 | 0.2009 | 0.2014 | 0.2129 | 0.1952 | 0.2676 | 0.2467 | 0.2441 | 0.2474 |
| 600 | 4.2167 | 0.1969 | 0.1969 | 0.2115 | 0.1935 | 0.2640 | 0.2443 | 0.2411 | 0.2443 |
| 601 | 4.2121 | 0.1971 | 0.1955 | 0.2088 | 0.1935 | 0.2591 | 0.2398 | 0.2395 | 0.2437 |
| 602 | 4.2135 | 0.1937 | 0.1949 | 0.2074 | 0.1909 | 0.2569 | 0.2383 | 0.2359 | 0.2397 |
| 603 | 4.2120 | 0.1933 | 0.1970 | 0.2078 | 0.1922 | 0.2558 | 0.2375 | 0.2343 | 0.2396 |
| 604 | 4.2115 | 0.1919 | 0.1936 | 0.2049 | 0.1918 | 0.2531 | 0.2339 | 0.2307 | 0.2355 |
| 605 | 4.2112 | 0.1953 | 0.1966 | 0.2084 | 0.1926 | 0.2533 | 0.2354 | 0.2324 | 0.2367 |
| 606 | 4.2106 | 0.1928 | 0.1928 | 0.2065 | 0.1915 | 0.2498 | 0.2320 | 0.2311 | 0.2327 |
| 607 | 4.2113 | 0.1908 | 0.1908 | 0.2055 | 0.1886 | 0.2457 | 0.2278 | 0.2278 | 0.2294 |
| 608 | 4.2082 | 0.1888 | 0.1902 | 0.2031 | 0.1872 | 0.2424 | 0.2263 | 0.2263 | 0.2293 |
| 609 | 4.2098 | 0.1885 | 0.1889 | 0.2041 | 0.1887 | 0.2417 | 0.2230 | 0.2246 | 0.2261 |
| 610 | 4.2071 | 0.1865 | 0.1890 | 0.2014 | 0.1875 | 0.2400 | 0.2214 | 0.2224 | 0.2240 |
| 611 | 4.2075 | 0.1877 | 0.1892 | 0.2005 | 0.1886 | 0.2378 | 0.2185 | 0.2214 | 0.2219 |
| 612 | 4.2070 | 0.1879 | 0.1894 | 0.2013 | 0.1881 | 0.2391 | 0.2180 | 0.2200 | 0.2200 |
| 613 | 4.2088 | 0.1864 | 0.1879 | 0.2012 | 0.1876 | 0.2344 | 0.2149 | 0.2179 | 0.2176 |
| 614 | 4.2039 | 0.1856 | 0.1871 | 0.2000 | 0.1852 | 0.2332 | 0.2139 | 0.2173 | 0.2149 |
| 615 | 4.2044 | 0.1847 | 0.1853 | 0.2000 | 0.1844 | 0.2309 | 0.2126 | 0.2162 | 0.2138 |
| 616 | 4.2032 | 0.1835 | 0.1823 | 0.2005 | 0.1844 | 0.2286 | 0.2087 | 0.2129 | 0.2111 |
| 617 | 4.2038 | 0.1818 | 0.1846 | 0.1965 | 0.1834 | 0.2252 | 0.2076 | 0.2134 | 0.2106 |
| 618 | 4.2011 | 0.1819 | 0.1842 | 0.1986 | 0.1847 | 0.2262 | 0.2052 | 0.2109 | 0.2095 |
| 619 | 4.2029 | 0.1821 | 0.1855 | 0.1976 | 0.1849 | 0.2268 | 0.2054 | 0.2102 | 0.2088 |
| 620 | 4.2022 | 0.1823 | 0.1851 | 0.1977 | 0.1851 | 0.2250 | 0.2048 | 0.2090 | 0.2076 |
| 621 | 4.2019 | 0.1826 | 0.1840 | 0.1965 | 0.1826 | 0.2243 | 0.2035 | 0.2077 | 0.2049 |
| 622 | 4.2004 | 0.1822 | 0.1836 | 0.1964 | 0.1822 | 0.2209 | 0.2029 | 0.2067 | 0.2043 |
| 623 | 4.1995 | 0.1801 | 0.1807 | 0.1959 | 0.1815 | 0.2179 | 0.2000 | 0.2042 | 0.2021 |
| 624 | 4.1997 | 0.1791 | 0.1812 | 0.1955 | 0.1818 | 0.2170 | 0.2003 | 0.2037 | 0.2010 |
| 625 | 4.1999 | 0.1782 | 0.1796 | 0.1946 | 0.1823 | 0.2136 | 0.1946 | 0.2000 | 0.1986 |
| 626 | 4.1987 | 0.1792 | 0.1826 | 0.1951 | 0.1833 | 0.2162 | 0.2013 | 0.2013 | 0.1992 |
| 627 | 4.1983 | 0.1797 | 0.1823 | 0.1952 | 0.1837 | 0.2141 | 0.1958 | 0.1986 | 0.1973 |
| 628 | 4.1967 | 0.1802 | 0.1823 | 0.1954 | 0.1823 | 0.2133 | 0.1957 | 0.1971 | 0.1954 |
| 629 | 4.1966 | 0.1789 | 0.1816 | 0.1950 | 0.1829 | 0.2112 | 0.1964 | 0.1977 | 0.1950 |
| 630 | 4.1951 | 0.1793 | 0.1810 | 0.1947 | 0.1813 | 0.2099 | 0.1947 | 0.1957 | 0.1931 |
| 631 | 4.1957 | 0.1777 | 0.1804 | 0.1940 | 0.1811 | 0.2073 | 0.1933 | 0.1952 | 0.1919 |
| 632 | 4.1953 | 0.1765 | 0.1792 | 0.1922 | 0.1810 | 0.2050 | 0.1899 | 0.1939 | 0.1908 |
| 633 | 4.1948 | 0.1769 | 0.1809 | 0.1918 | 0.1810 | 0.2064 | 0.1903 | 0.1918 | 0.1892 |
| 634 | 4.1942 | 0.1768 | 0.1811 | 0.1927 | 0.1822 | 0.2039 | 0.1891 | 0.1902 | 0.1889 |
| 635 | 4.1926 | 0.1781 | 0.1823 | 0.1928 | 0.1823 | 0.2046 | 0.1898 | 0.1904 | 0.1879 |
| 636 | 4.1931 | 0.1787 | 0.1831 | 0.1934 | 0.1822 | 0.2046 | 0.1898 | 0.1903 | 0.1863 |
| 637 | 4.1907 | 0.1799 | 0.1816 | 0.1947 | 0.1827 | 0.2019 | 0.1895 | 0.1883 | 0.1867 |
| 638 | 4.1900 | 0.1762 | 0.1812 | 0.1935 | 0.1802 | 0.1998 | 0.1881 | 0.1881 | 0.1841 |
| 639 | 4.1896 | 0.1765 | 0.1797 | 0.1927 | 0.1811 | 0.1967 | 0.1878 | 0.1873 | 0.1833 |
| 640 | 4.1891 | 0.1752 | 0.1809 | 0.1922 | 0.1814 | 0.1963 | 0.1864 | 0.1851 | 0.1819 |
| 641 | 4.1887 | 0.1757 | 0.1813 | 0.1921 | 0.1824 | 0.1961 | 0.1853 | 0.1852 | 0.1813 |
| 642 | 4.1876 | 0.1766 | 0.1818 | 0.1915 | 0.1820 | 0.1966 | 0.1846 | 0.1820 | 0.1805 |
| 643 | 4.1900 | 0.1785 | 0.1840 | 0.1939 | 0.1844 | 0.1966 | 0.1862 | 0.1839 | 0.1812 |
| 644 | 4.1877 | 0.1788 | 0.1829 | 0.1944 | 0.1832 | 0.1939 | 0.1859 | 0.1827 | 0.1799 |
| 645 | 4.1873 | 0.1783 | 0.1831 | 0.1933 | 0.1810 | 0.1929 | 0.1849 | 0.1821 | 0.1783 |
| 646 | 4.1879 | 0.1769 | 0.1799 | 0.1934 | 0.1813 | 0.1894 | 0.1839 | 0.1811 | 0.1757 |
| 647 | 4.1862 | 0.1758 | 0.1808 | 0.1918 | 0.1822 | 0.1886 | 0.1827 | 0.1794 | 0.1758 |
| 648 | 4.1851 | 0.1762 | 0.1811 | 0.1914 | 0.1825 | 0.1880 | 0.1811 | 0.1782 | 0.1746 |

TABLE 1.1-continued

| λ (nm) | W/o film layer | 1st light blocking sheet-No. 1-0 deg. | 1st light blocking sheet-No. 1-180 deg. | 1st light blocking sheet-No. 2-0 deg. | 1st light blocking sheet-No. 2-180 deg. | 2nd light blocking sheet-No. 1-0 deg. | 2nd light blocking sheet-No. 1-180 deg. | 2nd light blocking sheet-No. 2-0 deg. | 2nd light blocking sheet-No. 2-180 deg. |
|---|---|---|---|---|---|---|---|---|---|
| 649 | 4.1863 | 0.1763 | 0.1841 | 0.1916 | 0.1844 | 0.1877 | 0.1808 | 0.1766 | 0.1747 |
| 650 | 4.1838 | 0.1794 | 0.1837 | 0.1933 | 0.1850 | 0.1878 | 0.1822 | 0.1766 | 0.1725 |
| 651 | 4.1856 | 0.1776 | 0.1834 | 0.1926 | 0.1842 | 0.1866 | 0.1806 | 0.1758 | 0.1722 |
| 652 | 4.1842 | 0.1790 | 0.1841 | 0.1945 | 0.1854 | 0.1860 | 0.1805 | 0.1762 | 0.1714 |
| 653 | 4.1838 | 0.1783 | 0.1831 | 0.1940 | 0.1853 | 0.1831 | 0.1811 | 0.1755 | 0.1702 |
| 654 | 4.1834 | 0.1768 | 0.1851 | 0.1936 | 0.1838 | 0.1810 | 0.1796 | 0.1740 | 0.1711 |
| 655 | 4.1820 | 0.1770 | 0.1829 | 0.1928 | 0.1854 | 0.1794 | 0.1780 | 0.1741 | 0.1696 |
| 656 | 4.1819 | 0.1777 | 0.1841 | 0.1939 | 0.1862 | 0.1791 | 0.1770 | 0.1714 | 0.1693 |
| 657 | 4.1808 | 0.1785 | 0.1830 | 0.1929 | 0.1859 | 0.1799 | 0.1760 | 0.1708 | 0.1679 |
| 658 | 4.1818 | 0.1810 | 0.1880 | 0.1937 | 0.1881 | 0.1797 | 0.1769 | 0.1726 | 0.1698 |
| 659 | 4.1822 | 0.1811 | 0.1871 | 0.1952 | 0.1882 | 0.1794 | 0.1772 | 0.1716 | 0.1663 |
| 660 | 4.1796 | 0.1815 | 0.1866 | 0.1955 | 0.1879 | 0.1774 | 0.1774 | 0.1718 | 0.1669 |
| 661 | 4.1792 | 0.1782 | 0.1860 | 0.1942 | 0.1868 | 0.1746 | 0.1746 | 0.1700 | 0.1654 |
| 662 | 4.1802 | 0.1816 | 0.1861 | 0.1971 | 0.1901 | 0.1775 | 0.1775 | 0.1720 | 0.1678 |
| 663 | 4.1787 | 0.1780 | 0.1861 | 0.1934 | 0.1880 | 0.1724 | 0.1726 | 0.1673 | 0.1656 |
| 664 | 4.1788 | 0.1796 | 0.1878 | 0.1944 | 0.1902 | 0.1734 | 0.1742 | 0.1694 | 0.1672 |
| 665 | 4.1767 | 0.1812 | 0.1891 | 0.1951 | 0.1919 | 0.1742 | 0.1742 | 0.1695 | 0.1662 |
| 666 | 4.1759 | 0.1828 | 0.1911 | 0.1968 | 0.1915 | 0.1746 | 0.1759 | 0.1678 | 0.1662 |
| 667 | 4.1783 | 0.1820 | 0.1889 | 0.1948 | 0.1892 | 0.1720 | 0.1736 | 0.1690 | 0.1650 |
| 668 | 4.1779 | 0.1831 | 0.1901 | 0.1965 | 0.1915 | 0.1708 | 0.1747 | 0.1689 | 0.1655 |
| 669 | 4.1757 | 0.1832 | 0.1892 | 0.1966 | 0.1915 | 0.1692 | 0.1739 | 0.1688 | 0.1646 |
| 670 | 4.1756 | 0.1817 | 0.1898 | 0.1945 | 0.1913 | 0.1666 | 0.1707 | 0.1676 | 0.1647 |
| 671 | 4.1767 | 0.1818 | 0.1889 | 0.1954 | 0.1929 | 0.1688 | 0.1730 | 0.1675 | 0.1636 |
| 672 | 4.1758 | 0.1832 | 0.1916 | 0.1954 | 0.1949 | 0.1689 | 0.1726 | 0.1675 | 0.1651 |
| 673 | 4.1746 | 0.1833 | 0.1925 | 0.1964 | 0.1950 | 0.1682 | 0.1718 | 0.1676 | 0.1651 |
| 674 | 4.1754 | 0.1856 | 0.1918 | 0.1982 | 0.1968 | 0.1689 | 0.1731 | 0.1677 | 0.1639 |
| 675 | 4.1740 | 0.1859 | 0.1942 | 0.1985 | 0.1968 | 0.1664 | 0.1747 | 0.1679 | 0.1648 |
| 676 | 4.1744 | 0.1852 | 0.1922 | 0.1983 | 0.1945 | 0.1656 | 0.1740 | 0.1684 | 0.1633 |
| 677 | 4.1731 | 0.1843 | 0.1921 | 0.1975 | 0.1963 | 0.1647 | 0.1731 | 0.1683 | 0.1641 |
| 678 | 4.1716 | 0.1840 | 0.1924 | 0.1966 | 0.1955 | 0.1644 | 0.1716 | 0.1663 | 0.1632 |
| 679 | 4.1737 | 0.1853 | 0.1964 | 0.1980 | 0.1980 | 0.1657 | 0.1727 | 0.1683 | 0.1656 |
| 680 | 4.1720 | 0.1857 | 0.1942 | 0.1975 | 0.1989 | 0.1652 | 0.1718 | 0.1656 | 0.1642 |
| 681 | 4.1724 | 0.1882 | 0.1966 | 0.1988 | 0.2002 | 0.1671 | 0.1743 | 0.1670 | 0.1648 |
| 682 | 4.1727 | 0.1879 | 0.1963 | 0.1992 | 0.1984 | 0.1659 | 0.1732 | 0.1667 | 0.1639 |
| 683 | 4.1723 | 0.1880 | 0.1965 | 0.1993 | 0.2007 | 0.1653 | 0.1752 | 0.1654 | 0.1640 |
| 684 | 4.1716 | 0.1878 | 0.1963 | 0.2005 | 0.1995 | 0.1645 | 0.1740 | 0.1666 | 0.1658 |
| 685 | 4.1709 | 0.1884 | 0.1969 | 0.2004 | 0.2004 | 0.1650 | 0.1742 | 0.1664 | 0.1650 |
| 686 | 4.1702 | 0.1868 | 0.1985 | 0.1992 | 0.2013 | 0.1644 | 0.1733 | 0.1651 | 0.1641 |
| 687 | 4.1723 | 0.1901 | 0.1973 | 0.2001 | 0.2043 | 0.1646 | 0.1731 | 0.1660 | 0.1660 |
| 688 | 4.1709 | 0.1909 | 0.2006 | 0.2009 | 0.2030 | 0.1665 | 0.1728 | 0.1676 | 0.1668 |
| 689 | 4.1702 | 0.1925 | 0.2017 | 0.2025 | 0.2054 | 0.1663 | 0.1755 | 0.1676 | 0.1677 |
| 690 | 4.1684 | 0.1918 | 0.2007 | 0.2027 | 0.2052 | 0.1658 | 0.1757 | 0.1666 | 0.1662 |
| 691 | 4.1708 | 0.1931 | 0.2016 | 0.2031 | 0.2046 | 0.1662 | 0.1761 | 0.1689 | 0.1675 |
| 692 | 4.1666 | 0.1910 | 0.1984 | 0.2021 | 0.2049 | 0.1646 | 0.1760 | 0.1669 | 0.1655 |
| 693 | 4.1667 | 0.1929 | 0.2021 | 0.2029 | 0.2063 | 0.1651 | 0.1758 | 0.1688 | 0.1680 |
| 694 | 4.1675 | 0.1931 | 0.2030 | 0.2030 | 0.2082 | 0.1666 | 0.1756 | 0.1690 | 0.1700 |
| 695 | 4.1667 | 0.1937 | 0.2036 | 0.2036 | 0.2093 | 0.1668 | 0.1780 | 0.1684 | 0.1685 |
| 696 | 4.1665 | 0.1963 | 0.2060 | 0.2057 | 0.2126 | 0.1693 | 0.1792 | 0.1707 | 0.1716 |
| 697 | 4.1668 | 0.1967 | 0.2058 | 0.2050 | 0.2100 | 0.1686 | 0.1784 | 0.1700 | 0.1697 |
| 698 | 4.1674 | 0.1975 | 0.2064 | 0.2073 | 0.2107 | 0.1693 | 0.1792 | 0.1717 | 0.1712 |
| 699 | 4.1643 | 0.1958 | 0.2042 | 0.2056 | 0.2109 | 0.1664 | 0.1788 | 0.1692 | 0.1703 |
| 700 | 4.1671 | 0.1977 | 0.2061 | 0.2075 | 0.2121 | 0.1682 | 0.1809 | 0.1726 | 0.1714 |
| 701 | 4.1642 | 0.1969 | 0.2058 | 0.2067 | 0.2132 | 0.1669 | 0.1795 | 0.1725 | 0.1720 |
| 702 | 4.1647 | 0.1976 | 0.2083 | 0.2074 | 0.2139 | 0.1685 | 0.1811 | 0.1724 | 0.1719 |
| 703 | 4.1626 | 0.1975 | 0.2088 | 0.2074 | 0.2156 | 0.1695 | 0.1809 | 0.1735 | 0.1723 |
| 704 | 4.1660 | 0.2002 | 0.2114 | 0.2088 | 0.2158 | 0.1708 | 0.1834 | 0.1737 | 0.1748 |
| 705 | 4.1637 | 0.2000 | 0.2108 | 0.2094 | 0.2164 | 0.1701 | 0.1832 | 0.1743 | 0.1729 |
| 706 | 4.1626 | 0.2003 | 0.2102 | 0.2102 | 0.2174 | 0.1703 | 0.1852 | 0.1753 | 0.1739 |
| 707 | 4.1623 | 0.2015 | 0.2113 | 0.2115 | 0.2174 | 0.1709 | 0.1863 | 0.1753 | 0.1751 |
| 708 | 4.1620 | 0.2008 | 0.2107 | 0.2105 | 0.2190 | 0.1699 | 0.1867 | 0.1768 | 0.1767 |
| 709 | 4.1608 | 0.2009 | 0.2121 | 0.2097 | 0.2190 | 0.1708 | 0.1858 | 0.1760 | 0.1755 |
| 710 | 4.1635 | 0.2019 | 0.2139 | 0.2110 | 0.2214 | 0.1722 | 0.1878 | 0.1780 | 0.1778 |
| 711 | 4.1615 | 0.2039 | 0.2154 | 0.2123 | 0.2222 | 0.1729 | 0.1898 | 0.1777 | 0.1785 |
| 712 | 4.1622 | 0.2045 | 0.2158 | 0.2130 | 0.2215 | 0.1736 | 0.1905 | 0.1792 | 0.1778 |
| 713 | 4.1609 | 0.2044 | 0.2157 | 0.2133 | 0.2214 | 0.1747 | 0.1917 | 0.1794 | 0.1790 |
| 714 | 4.1609 | 0.2061 | 0.2167 | 0.2153 | 0.2231 | 0.1756 | 0.1941 | 0.1813 | 0.1813 |
| 715 | 4.1621 | 0.2049 | 0.2159 | 0.2145 | 0.2241 | 0.1747 | 0.1946 | 0.1815 | 0.1818 |
| 716 | 4.1582 | 0.2050 | 0.2150 | 0.2150 | 0.2235 | 0.1737 | 0.1950 | 0.1808 | 0.1808 |
| 717 | 4.1614 | 0.2062 | 0.2190 | 0.2158 | 0.2269 | 0.1748 | 0.1962 | 0.1816 | 0.1844 |
| 718 | 4.1582 | 0.2073 | 0.2195 | 0.2159 | 0.2273 | 0.1759 | 0.1973 | 0.1823 | 0.1845 |
| 719 | 4.1593 | 0.2094 | 0.2208 | 0.2180 | 0.2288 | 0.1789 | 0.1994 | 0.1830 | 0.1854 |
| 720 | 4.1570 | 0.2083 | 0.2212 | 0.2169 | 0.2269 | 0.1781 | 0.1982 | 0.1838 | 0.1867 |
| 721 | 4.1577 | 0.2125 | 0.2211 | 0.2197 | 0.2297 | 0.1797 | 0.2038 | 0.1855 | 0.1861 |
| 722 | 4.1575 | 0.2111 | 0.2204 | 0.2189 | 0.2290 | 0.1794 | 0.2031 | 0.1864 | 0.1880 |

TABLE 1.1-continued

| λ (nm) | W/o film layer | 1st light blocking sheet-No. 1-0 deg. | 1st light blocking sheet-No. 1-180 deg. | 1st light blocking sheet-No. 2-0 deg. | 1st light blocking sheet-No. 2-180 deg. | 2nd light blocking sheet-No. 1-0 deg. | 2nd light blocking sheet-No. 1-180 deg. | 2nd light blocking sheet-No. 2-0 deg. | 2nd light blocking sheet-No. 2-180 deg. |
|---|---|---|---|---|---|---|---|---|---|
| 723 | 4.1568 | 0.2106 | 0.2217 | 0.2203 | 0.2304 | 0.1799 | 0.2044 | 0.1885 | 0.1895 |
| 724 | 4.1583 | 0.2097 | 0.2213 | 0.2185 | 0.2313 | 0.1794 | 0.2026 | 0.1880 | 0.1895 |
| 725 | 4.1591 | 0.2111 | 0.2244 | 0.2210 | 0.2331 | 0.1810 | 0.2077 | 0.1882 | 0.1923 |
| 726 | 4.1564 | 0.2126 | 0.2265 | 0.2207 | 0.2334 | 0.1824 | 0.2068 | 0.1890 | 0.1925 |
| 727 | 4.1561 | 0.2143 | 0.2264 | 0.2216 | 0.2337 | 0.1834 | 0.2095 | 0.1901 | 0.1926 |
| 728 | 4.1571 | 0.2162 | 0.2292 | 0.2248 | 0.2339 | 0.1870 | 0.2132 | 0.1930 | 0.1957 |
| 729 | 4.1557 | 0.2163 | 0.2269 | 0.2239 | 0.2356 | 0.1861 | 0.2138 | 0.1949 | 0.1951 |
| 730 | 4.1566 | 0.2140 | 0.2265 | 0.2242 | 0.2358 | 0.1858 | 0.2140 | 0.1945 | 0.1965 |
| 731 | 4.1554 | 0.2132 | 0.2258 | 0.2234 | 0.2351 | 0.1850 | 0.2151 | 0.1947 | 0.1967 |
| 732 | 4.1571 | 0.2144 | 0.2276 | 0.2234 | 0.2363 | 0.1867 | 0.2161 | 0.1944 | 0.1984 |
| 733 | 4.1546 | 0.2156 | 0.2288 | 0.2242 | 0.2387 | 0.1903 | 0.2184 | 0.1975 | 0.1995 |
| 734 | 4.1559 | 0.2181 | 0.2309 | 0.2260 | 0.2393 | 0.1913 | 0.2201 | 0.1971 | 0.2020 |
| 735 | 4.1546 | 0.2194 | 0.2320 | 0.2282 | 0.2397 | 0.1935 | 0.2223 | 0.1993 | 0.2040 |
| 736 | 4.1561 | 0.2199 | 0.2320 | 0.2288 | 0.2403 | 0.1934 | 0.2241 | 0.2005 | 0.2039 |
| 737 | 4.1545 | 0.2178 | 0.2323 | 0.2282 | 0.2384 | 0.1942 | 0.2266 | 0.2004 | 0.2032 |
| 738 | 4.1538 | 0.2182 | 0.2309 | 0.2295 | 0.2392 | 0.1946 | 0.2270 | 0.2030 | 0.2049 |
| 739 | 4.1541 | 0.2195 | 0.2334 | 0.2289 | 0.2416 | 0.1951 | 0.2275 | 0.2033 | 0.2062 |
| 740 | 4.1551 | 0.2209 | 0.2342 | 0.2310 | 0.2454 | 0.1994 | 0.2319 | 0.2059 | 0.2100 |
| 741 | 4.1521 | 0.2204 | 0.2337 | 0.2307 | 0.2441 | 0.1984 | 0.2309 | 0.2041 | 0.2086 |
| 742 | 4.1547 | 0.2231 | 0.2364 | 0.2324 | 0.2455 | 0.2030 | 0.2360 | 0.2068 | 0.2112 |
| 743 | 4.1529 | 0.2248 | 0.2374 | 0.2344 | 0.2465 | 0.2041 | 0.2375 | 0.2093 | 0.2130 |
| 744 | 4.1505 | 0.2258 | 0.2388 | 0.2370 | 0.2473 | 0.2053 | 0.2403 | 0.2097 | 0.2150 |
| 745 | 4.1522 | 0.2238 | 0.2358 | 0.2343 | 0.2477 | 0.2044 | 0.2417 | 0.2119 | 0.2149 |
| 746 | 4.1508 | 0.2258 | 0.2385 | 0.2366 | 0.2479 | 0.2071 | 0.2445 | 0.2120 | 0.2164 |
| 747 | 4.1516 | 0.2249 | 0.2384 | 0.2346 | 0.2481 | 0.2062 | 0.2444 | 0.2114 | 0.2166 |
| 748 | 4.1491 | 0.2250 | 0.2416 | 0.2359 | 0.2495 | 0.2096 | 0.2454 | 0.2141 | 0.2190 |
| 749 | 4.1540 | 0.2276 | 0.2427 | 0.2382 | 0.2518 | 0.2126 | 0.2487 | 0.2141 | 0.2216 |
| 750 | 4.1503 | 0.2297 | 0.2433 | 0.2391 | 0.2516 | 0.2150 | 0.2504 | 0.2161 | 0.2213 |
| 751 | 4.1507 | 0.2311 | 0.2447 | 0.2417 | 0.2540 | 0.2168 | 0.2554 | 0.2175 | 0.2243 |
| 752 | 4.1493 | 0.2294 | 0.2420 | 0.2400 | 0.2518 | 0.2174 | 0.2570 | 0.2179 | 0.2239 |
| 753 | 4.1514 | 0.2301 | 0.2438 | 0.2422 | 0.2515 | 0.2180 | 0.2576 | 0.2209 | 0.2255 |
| 754 | 4.1487 | 0.2307 | 0.2448 | 0.2417 | 0.2552 | 0.2200 | 0.2598 | 0.2216 | 0.2280 |
| 755 | 4.1496 | 0.2320 | 0.2467 | 0.2436 | 0.2565 | 0.2219 | 0.2618 | 0.2228 | 0.2305 |
| 756 | 4.1496 | 0.2326 | 0.2474 | 0.2433 | 0.2571 | 0.2244 | 0.2633 | 0.2233 | 0.2310 |
| 757 | 4.1476 | 0.2355 | 0.2495 | 0.2449 | 0.2587 | 0.2292 | 0.2677 | 0.2263 | 0.2325 |
| 758 | 4.1486 | 0.2355 | 0.2505 | 0.2461 | 0.2582 | 0.2293 | 0.2693 | 0.2262 | 0.2350 |
| 759 | 4.1471 | 0.2373 | 0.2497 | 0.2478 | 0.2586 | 0.2317 | 0.2723 | 0.2286 | 0.2360 |
| 760 | 4.1479 | 0.2360 | 0.2494 | 0.2484 | 0.2583 | 0.2323 | 0.2738 | 0.2292 | 0.2376 |
| 761 | 4.1452 | 0.2362 | 0.2502 | 0.2500 | 0.2607 | 0.2345 | 0.2776 | 0.2314 | 0.2405 |
| 762 | 4.1484 | 0.2357 | 0.2509 | 0.2493 | 0.2606 | 0.2341 | 0.2762 | 0.2337 | 0.2405 |
| 763 | 4.1452 | 0.2381 | 0.2523 | 0.2496 | 0.2625 | 0.2371 | 0.2793 | 0.2340 | 0.2444 |
| 764 | 4.1479 | 0.2395 | 0.2548 | 0.2491 | 0.2629 | 0.2395 | 0.2817 | 0.2354 | 0.2448 |
| 765 | 4.1456 | 0.2419 | 0.2573 | 0.2536 | 0.2654 | 0.2445 | 0.2854 | 0.2398 | 0.2492 |
| 766 | 4.1477 | 0.2427 | 0.2569 | 0.2538 | 0.2647 | 0.2458 | 0.2868 | 0.2383 | 0.2491 |
| 767 | 4.1439 | 0.2428 | 0.2575 | 0.2553 | 0.2654 | 0.2464 | 0.2913 | 0.2428 | 0.2506 |
| 768 | 4.1442 | 0.2429 | 0.2562 | 0.2554 | 0.2640 | 0.2476 | 0.2914 | 0.2437 | 0.2523 |
| 769 | 4.1459 | 0.2430 | 0.2571 | 0.2556 | 0.2650 | 0.2489 | 0.2928 | 0.2446 | 0.2540 |
| 770 | 4.1438 | 0.2431 | 0.2572 | 0.2541 | 0.2681 | 0.2494 | 0.2948 | 0.2431 | 0.2571 |
| 771 | 4.1428 | 0.2458 | 0.2611 | 0.2583 | 0.2696 | 0.2549 | 0.2966 | 0.2486 | 0.2589 |
| 772 | 4.1456 | 0.2467 | 0.2615 | 0.2592 | 0.2711 | 0.2559 | 0.2993 | 0.2489 | 0.2617 |
| 773 | 4.1455 | 0.2495 | 0.2631 | 0.2600 | 0.2720 | 0.2594 | 0.3023 | 0.2506 | 0.2636 |
| 774 | 4.1416 | 0.2493 | 0.2647 | 0.2615 | 0.2713 | 0.2615 | 0.3040 | 0.2535 | 0.2648 |
| 775 | 4.1439 | 0.2506 | 0.2634 | 0.2618 | 0.2726 | 0.2618 | 0.3088 | 0.2543 | 0.2681 |
| 776 | 4.1431 | 0.2491 | 0.2632 | 0.2622 | 0.2711 | 0.2622 | 0.3088 | 0.2569 | 0.2679 |
| 777 | 4.1418 | 0.2503 | 0.2644 | 0.2626 | 0.2723 | 0.2635 | 0.3099 | 0.2581 | 0.2700 |
| 778 | 4.1415 | 0.2510 | 0.2664 | 0.2645 | 0.2742 | 0.2673 | 0.3132 | 0.2588 | 0.2739 |
| 779 | 4.1444 | 0.2531 | 0.2673 | 0.2642 | 0.2751 | 0.2674 | 0.3144 | 0.2610 | 0.2751 |
| 780 | 4.1437 | 0.2551 | 0.2716 | 0.2689 | 0.2771 | 0.2736 | 0.3180 | 0.2641 | 0.2783 |

TABLE 1.2

| | W/o film layer | 1st light blocking sheet-No. 1-0 deg. | 1st light blocking sheet-No. 1-180 deg. | 1st light blocking sheet-No. 2-0 deg. | 1st light blocking sheet-No. 2-180 deg. | 2nd light blocking sheet-No. 1-0 deg. | 2nd light blocking sheet-No. 1-180 deg. | 2nd light blocking sheet-No. 2-0 deg. | 2nd light blocking sheet-No. 2-180 deg. |
|---|---|---|---|---|---|---|---|---|---|
| $R_{Max}$ (%) | N/A | 1.0293 | 1.0022 | 1.0551 | 0.9964 | 1.1928 | 1.3143 | 1.1486 | 1.1829 |
| $\lambda_{RMax}$ (nm) | N/A | 438 | 438 | 439 | 437 | 446 | 438 | 440 | 444 |
| $R_{high}$ (%) | N/A | 0.86 | 0.84 | 0.89 | 0.85 | 1.01 | 1.08 | 0.95 | 0.99 |
| $R_2$ (%) | N/A | 0.28 | 0.28 | 0.29 | 0.27 | 0.32 | 0.31 | 0.30 | 0.30 |

TABLE 1.2-continued

|  | W/o film layer | 1st light blocking sheet-No. 1-0 deg. | 1st light blocking sheet-No. 1-180 deg. | 1st light blocking sheet-No. 2-0 deg. | 1st light blocking sheet-No. 2-180 deg. | 2nd light blocking sheet-No. 1-0 deg. | 2nd light blocking sheet-No. 1-180 deg. | 2nd light blocking sheet-No. 2-0 deg. | 2nd light blocking sheet-No. 2-180 deg. |
|---|---|---|---|---|---|---|---|---|---|
| $R_{high}/R_2$ | N/A | 3.10 | 2.99 | 3.11 | 3.10 | 3.17 | 3.45 | 3.14 | 3.31 |
| $R_{3878}$ (%) | 4.25 | 0.43 | 0.42 | 0.44 | 0.42 | 0.49 | 0.51 | 0.47 | 0.47 |

TABLE 1.3

| Measurement items | L* | a* | b* | CI = {(L*) × [(a*)^2 + (b*)^2]}^1/2 | \|ΔCI\| |
|---|---|---|---|---|---|
| W/o film layer | 7.80 | 3.10 | −0.47 | 8.76 |  |
| 1st light blocking sheet-No. 1-0 deg. | 4.17 | −0.24 | −9.51 | 19.42 | 2.07 |
| 1st light blocking sheet-No. 1-180 deg. | 3.81 | 1.03 | −10.96 | 21.49 |  |
| 1st light blocking sheet-No. 2-0 deg. | 3.78 | 0.21 | −9.41 | 18.29 | 0.75 |
| 1st light blocking sheet-No. 2-180 deg. | 3.79 | 0.41 | −9.77 | 19.04 |  |
| 2nd light blocking sheet-No. 1-0 deg. | 3.17 | 0.58 | −8.85 | 15.80 | 0.60 |
| 2nd light blocking sheet-No. 1-180 deg. | 3.14 | 0.55 | −8.56 | 15.20 |  |
| 2nd light blocking sheet-No. 2-0 deg. | 3.21 | 0.89 | −9.08 | 16.35 | 1.50 |
| 2nd light blocking sheet-No. 2-180 deg. | 2.90 | 1.13 | −8.64 | 14.85 |  |

TABLE 1.4

| FOV (deg.) | 120 | φs2 (mm) | 1.22 |
|---|---|---|---|
| Db (mm) | 6.21 | Ts1 (μm) | 23 |
| Ds1 (mm) | 1.14 | Ts2 (μm) | 16 |
| Ds2 (mm) | 1.82 | Ds1/Db | 0.18 |
| φb (mm) | 4.54 | Ds2/Db | 0.29 |
| φs1 (mm) | 2.64 |  |  |

2nd Embodiment

FIG. 2A is a three-dimensional view observed from an object side of an optical lens assembly 200 according to the 2nd embodiment of the present disclosure, FIG. 2B is a top view observed from the object side of the optical lens assembly 200 in FIG. 2A, and FIG. 2C is a partially cross-sectional view of the optical lens assembly 200 in FIG. 2A. With reference to FIG. 2A to FIG. 2C, the optical lens assembly 200 includes a lens barrel 210 and an optical lens group 230. The lens barrel 210 includes a light entering hole 211, which is configured for allowing a light to enter the lens barrel 210. The lens barrel 210 accommodates the optical lens group 230, and an optical axis z passes through the optical lens group 230 (as shown in FIG. 2C). The optical lens group 230 includes a first lens element 271, a second lens element 272, a third lens element 273, a fourth lens element 274, a fifth lens element 275 and a sixth lens element 276 in order from the object side (i.e., a left side in FIG. 2C) to an image side (i.e., a right side in FIG. 2C) along the optical axis z. A total number of lens elements in the optical lens group 230 is six. The reference numerals of the transparent lens elements such as the first lens element 271, etc. are omitted in FIG. 2A and FIG. 2B. Partial surface shapes of the lens elements are omitted in FIG. 2C. A number of the light blocking sheet of the optical lens group 230 is at least one, and the optical lens group 230 specifically further includes annular optical elements such as a light blocking sheet 240, another light blocking sheet, a spacer, a retainer, etc. The light blocking sheet 240 is disposed and connected between the first lens element 271 and the second lens element 272.

FIG. 2D is a top view of the light blocking sheet 240 of the optical lens assembly 200 in FIG. 2A. With reference to FIG. 2C and FIG. 2D, the light blocking sheet 240 is an opaque sheet-shaped element and surrounds the optical axis z to form a light passing hole 241, which is in a circular shape. The light blocking sheet 240 includes an object-side surface 245 and an image-side surface 246, and the object-side surface 245 is located more adjacent to the light entering hole 211 than the image-side surface 246 thereto. A first film layer 249 is disposed on the object-side surface 245. The first film layer 249 is disposed from the light passing hole 241 along a direction being away from the optical axis z, and a coverage area of the first film layer 249 is smaller than an area of the object-side surface 245.

FIG. 2E is a cross-sectional view along line 2E-2E in FIG. 2D (not drawn with an actual scale). With reference to FIG. 2E, the light blocking sheet 240 specifically includes a base layer 262 and a covering layer 263, the first film layer 249 is disposed on and in physical contact with an object-side surface of the base layer 262, and an image side surface of the base layer 262 is in physical contact with the covering layer 263.

FIG. 2F is a top view of a light blocking sheet 250 that can be applicable to the optical lens assembly 200 in FIG. 2A, and an object-side surface 255 of the light blocking sheet 250 is observed in FIG. 2F. With reference to FIG. 2F, the light blocking sheet 240 of the optical lens group 230 may be replaced by the light blocking sheet 250, and the light blocking sheet 250 may be disposed and connected between the first lens element 271 and the second lens element 272. The light blocking sheet 250 is an opaque sheet-shaped element and surrounds the optical axis z to form a light passing hole 251, which is in a circular shape. An annular wall forming the light passing hole 251 includes a plurality of arc-shaped convex portions, and each of the arc-shaped convex portions protrudes toward the optical axis z, and the arc-shaped convex portions are connected in sequence. A shape of a light passing hole of a light blocking sheet of an optical lens assembly according to the present disclosure can be in any shape, and is not limited thereto.

With reference to the following Table 2, a maximum field of view of the optical lens assembly 200 is FOV. In a direction along the optical axis z, a distance between a most object-side end 215 of the lens barrel 210 and a most image-side end 216 of the lens barrel 210 is Db, and a distance between the most object-side end 215 of the lens barrel 210 and the first film layer 249 is Ds. A diameter of the light entering hole 211 is φb, a diameter of the light passing hole 241 is φs, and a thickness in the direction along the optical axis z of the light blocking sheet 240 is Ts. The following Table 2 lists the parameter values according to the aforementioned definitions of the optical lens assembly 200 in the 2nd embodiment. In addition, regarding other details of the light blocking sheet 240 in the 2nd embodiment, the contents of the first light blocking sheet 140 and the second light blocking sheet 150 in the 1st embodiment can be referred, but the light blocking sheet 240 is not limited thereto.

TABLE 2

| FOV (deg.) | 117.3 | φs (mm) | 1.29 |
| Db (mm) | 5.2 | Ts (μm) | 23 |
| Ds (mm) | 0.9798 | Ds/Db | 0.19 |
| φb (mm) | 2.9 | | |

3rd Embodiment

Figure 3A:
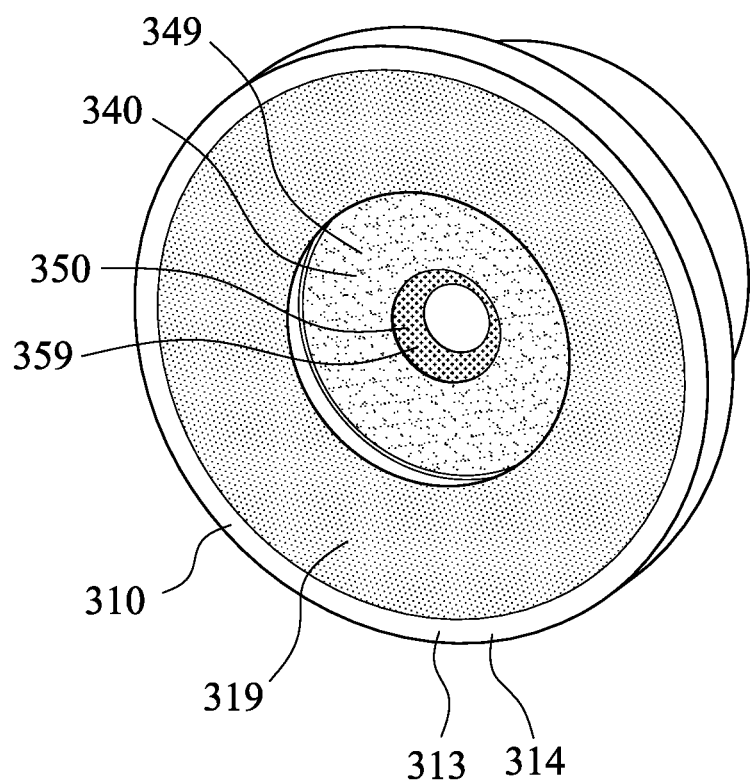
FIG. 3A is a three-dimensional view of an optical lens assembly according to the 3rd embodiment of the present disclosure.
Figure 3B:
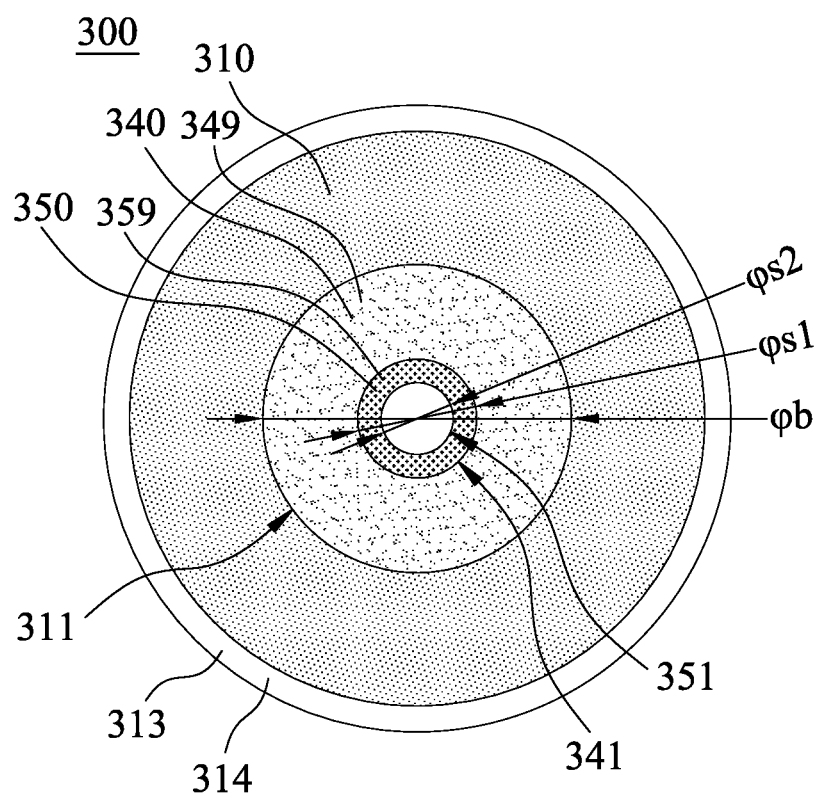
FIG. 3B is a top view of the optical lens assembly in FIG. 3A.
Figure 3C:
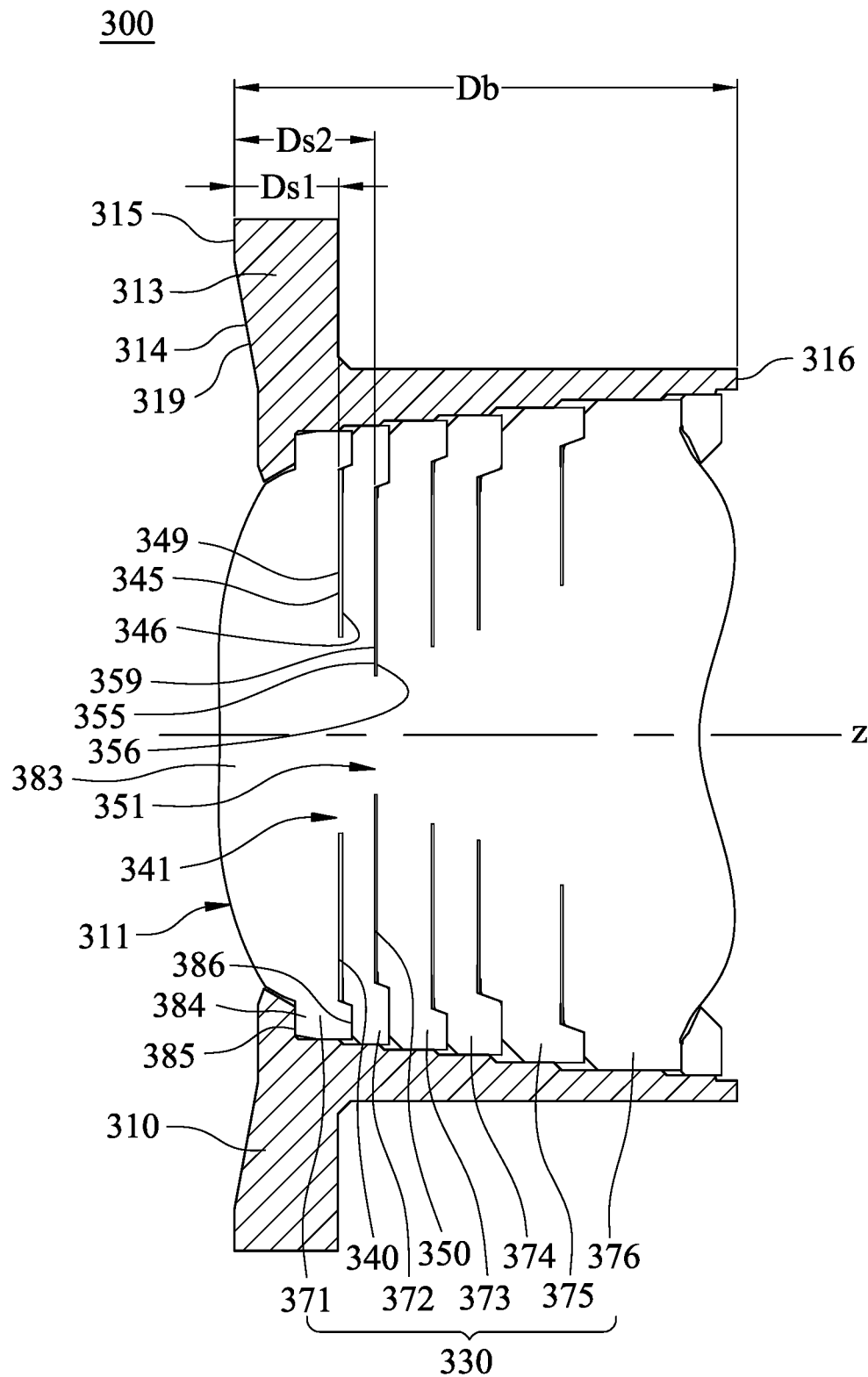
FIG. 3C is a partially cross-sectional view of the optical lens assembly in FIG. 3A.

FIG. 3A is a three-dimensional view observed from an object side of an optical lens assembly 300 according to the 3rd embodiment of the present disclosure, FIG. 3B is a top view observed from the object side of the optical lens assembly 300 in FIG. 3A, and FIG. 3C is a partially cross-sectional view of the optical lens assembly 300 in FIG. 3A. With reference to FIG. 3A to FIG. 3C, the optical lens assembly 300 includes a lens barrel 310 and an optical lens group 330. The lens barrel 310 includes a light entering hole 311, which is configured for allowing a light to enter the lens barrel 310. The lens barrel 310 accommodates the optical lens group 330, and an optical axis z passes through the optical lens group 330 (as shown in FIG. 3C). The optical lens group 330 includes a first lens element 371, a second lens element 372, a third lens element 373, a fourth lens element 374, a fifth lens element 375 and a sixth lens element 376 in order from the object side (i.e., a left side in FIG. 3C) to an image side (i.e., a right side in FIG. 3C) along the optical axis z. A total number of lens elements in the optical lens group 330 is six. The reference numerals of the transparent lens elements such as the first lens element 371, etc. are omitted in FIG. 3A and FIG. 3B. Partial surface shapes of the lens elements are omitted in FIG. 3C. A number of the light blocking sheet of the optical lens group 330 is at least two, and the optical lens group 330 specifically further includes annular optical elements such as a first light blocking sheet 340, a second light blocking sheet 350, another light blocking sheet, a spacer, a retainer, etc. The first light blocking sheet 340 is disposed and connected between the first lens element 371 and the second lens element 372, and the second light blocking sheet 350 is disposed and connected between the second lens element 372 and third lens element 373.

Figure 3D:
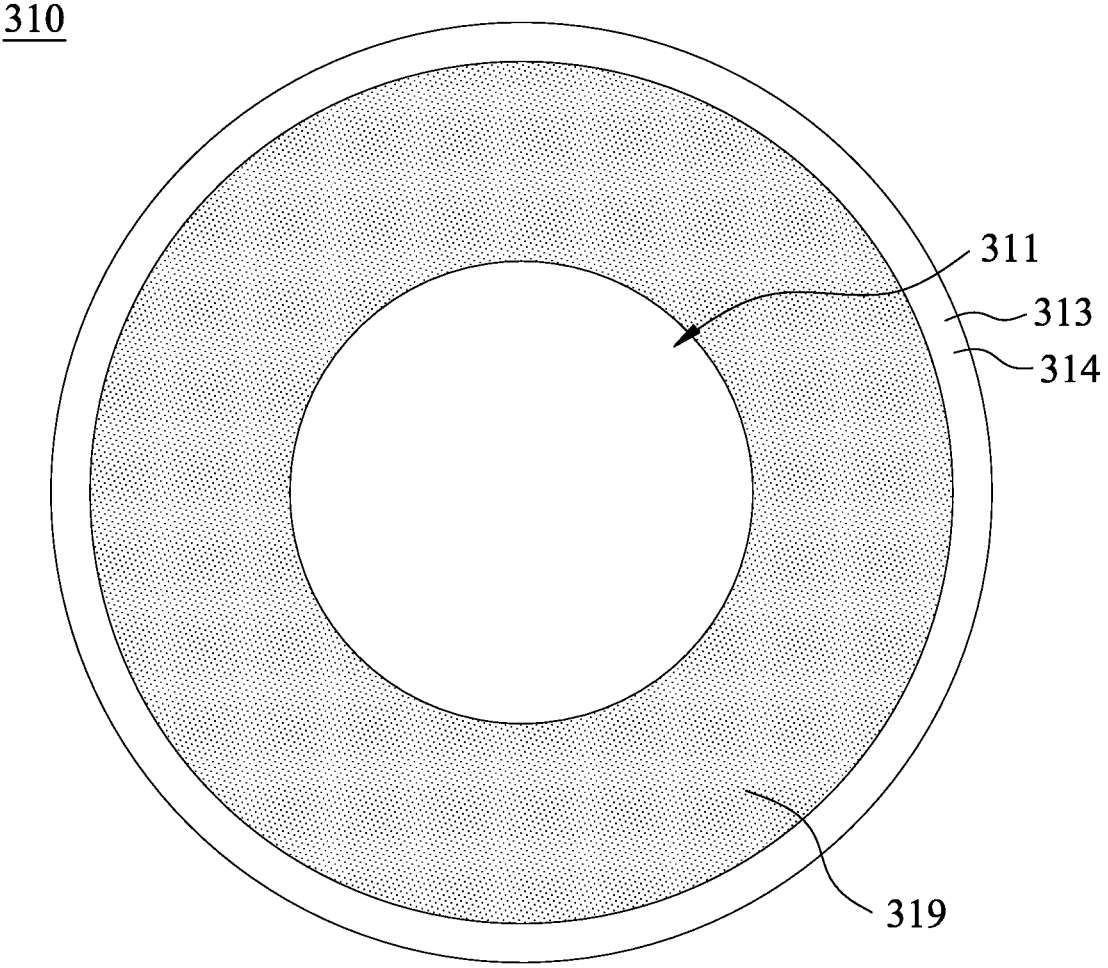
FIG. 3D is a top view of a lens barrel of the optical lens assembly in FIG. 3A.

FIG. 3D is a top view of the lens barrel 310 of the optical lens assembly 300 in FIG. 3A. With reference to FIG. 3A to FIG. 3D, an object-side portion 313 of the lens barrel 310 may include a top wall 314 surrounding the optical axis z to form the light entering hole 311, and a second film layer 319 is disposed on an outer surface facing the object side of the top wall 314.

A reflected light is obtained from the second film layer 319 irradiated by the standard illuminant D65, a color index of the reflected light is defined according to the CIE 1976 L*a*b* color space, the color index is CI2, the reflected light has a maximum reflectivity in a spectrum in the wavelength range of 380 nm to 780 nm, a wavelength range of a wavelength corresponding to the maximum reflectivity minus 50 nm to the wavelength thereto plus 50 nm is a high reflectivity section, a wavelength range remained in a wavelength range of 380 nm to 780 nm excluding the high reflectivity section is a second reflectivity section, an average reflectivity in the high reflectivity section is R2$_{high}$, an average reflectivity in the second reflectivity section is R2$_2$, and the following conditions are satisfied: CI2={(L*)× [(a*)$^2$+(b*)$^2$]}$^{1/2}$, 11≤CI2≤41; and 1.8≤R2$_{high}$/R2$_2$≤6.2.

Figure 3E:
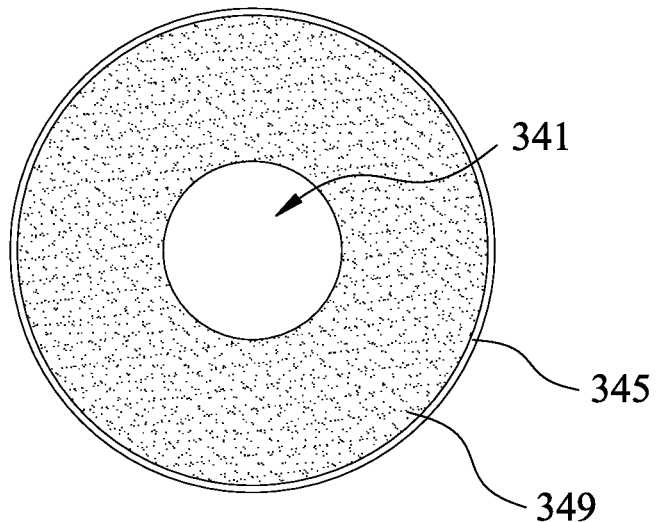
FIG. 3E is a top view of a first light blocking sheet of the optical lens assembly in FIG. 3A.
Figure 3F:
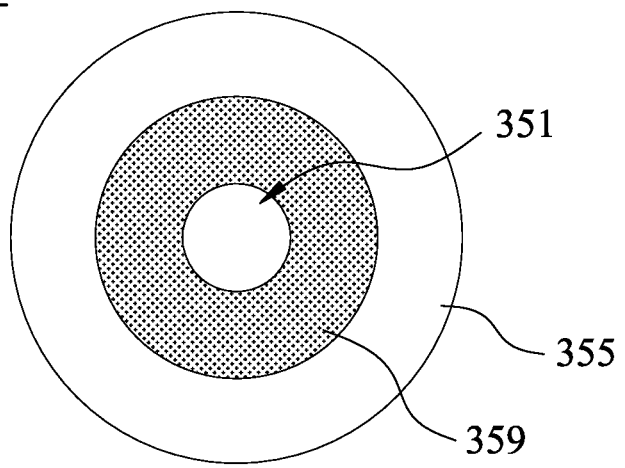
FIG. 3F is a top view of a second light blocking sheet of the optical lens assembly in FIG. 3A.

FIG. 3E is a top view of the first light blocking sheet 340 of the optical lens assembly 300 in FIG. 3A, and FIG. 3F is a top view of the second light blocking sheet 350 of the optical lens assembly 300 in FIG. 3A. With reference to FIG. 3C, FIG. 3E and FIG. 3F, the first light blocking sheet 340 is an opaque sheet-shaped element and surrounds the optical axis z to form a light passing hole 341. The first light blocking sheet 340 includes an object-side surface 345 and an image-side surface 346, and the object-side surface 345 is located more adjacent to the light entering hole 311 than the image-side surface 346 thereto. A first film layer 349 is disposed on the object-side surface 345. The second light blocking sheet 350 is an opaque sheet-shaped element and surrounds the optical axis z to form a light passing hole 351. The second light blocking sheet 350 includes an object-side surface 355 and an image-side surface 356, and the object-side surface 355 is located more adjacent to the light entering hole 311 than the image-side surface 356 thereto. A first film layer 359 is disposed on the object-side surface 355.

The first film layer 349 is disposed from the light passing hole 341 along a direction being away from the optical axis z, and a coverage area of the first film layer 349 is smaller than an area of the object-side surface 345. The first film layer 359 is disposed from the light passing hole 351 along the direction being away from the optical axis z, and a coverage area of the first film layer 359 is smaller than an area of the object-side surface 355.

Diameters of the light passing holes 341, 351 of the first light blocking sheet 340 and the second light blocking sheet 350, respectively, are different. The diameter of the light passing hole 341 of the first light blocking sheet 340 closer to the object side is greater than the diameter of the light passing hole 351 of the second light blocking sheet 350. Regarding other details of the first light blocking sheet 340 and the second light blocking sheet 350 in the 3rd embodiment, the contents of the first light blocking sheet 140 and the second light blocking sheet 150 in the 1st embodiment can be referred, but the first light blocking sheet 340 and the second light blocking sheet 350 are not limited thereto.

Figure 3G:
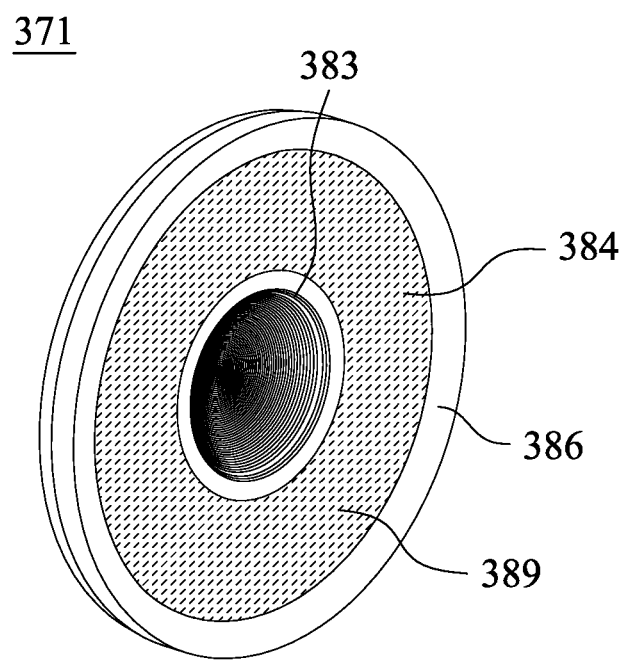
FIG. 3G is a three-dimensional view of a first lens element of the optical lens assembly in FIG. 3A.

FIG. 3G is a three-dimensional view observed from the image side of the first lens element 371 of the optical lens assembly 300 in FIG. 3A. With reference to FIG. 3C and FIG. 3G, the first lens element 371 is disposed on an object side of the first light blocking sheet 340 and the second light blocking sheet 350. The first lens element 371 includes an optical effective region 383 and a peripheral region 384. The optical effective region 383 is configured for being passed through by the light. The peripheral region 384 is located farther from the optical axis z than the optical effective region 383 therefrom, and a third film layer 389 is disposed on at least one of a peripheral object-side surface 385 and a peripheral image-side surface 386 (at least the peripheral image-side surface 386, specifically) of the peripheral region 384.

Figure 3H:
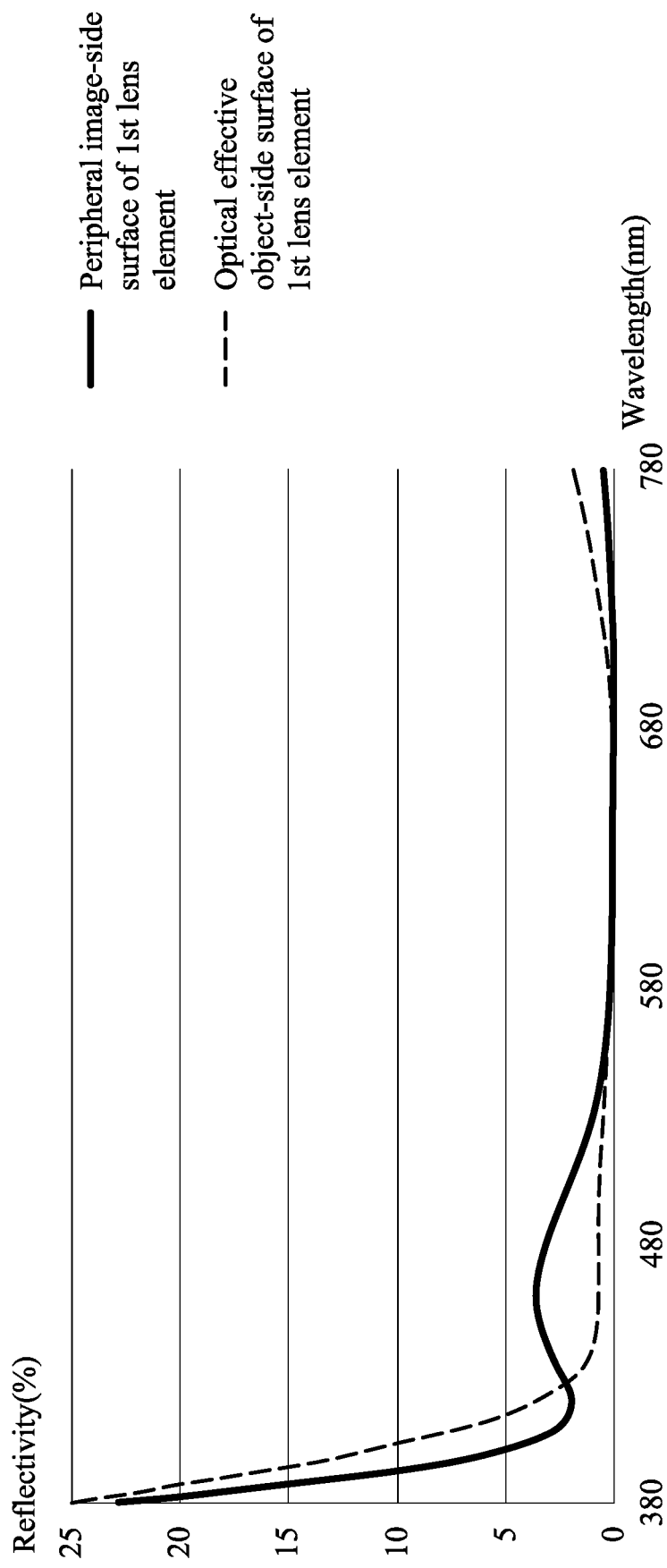
FIG. 3H is a schematic view of reflectivity of the first lens element in FIG. 3G.

FIG. 3H is a schematic view of reflectivity of the first lens element 371 in FIG. 3G, the third film layer 389 is disposed on the peripheral image-side surface 386 of the first lens element 371, and third film layers may be disposed on an optical effective object-side surface and an optical effective image-side surface (reference numerals omitted), respectively, of the optical effective region 383 of the first lens element 371. With reference to FIG. 3H and further to Table 3.1, Table 3.2, Table 3.3 and Table 3.4 as the following, Table 3.1 to Table 3.4 list parameter values of the optical lens assembly 300 and the third film layer 389 of the first lens element 371 thereof in the 3rd embodiment of the present disclosure.

In detail, with reference to the following Table 3.1, Table 3.1 lists the reflectivity values of the third film layer 389 of the peripheral image-side surface 386 and the third film layer of the optical effective object-side surface of the first lens element 371 of the optical lens assembly 300 in the 3rd embodiment of the present disclosure. In Table 3.1, the unit of the reflectivity value is %. The relationship diagram between the wavelengths and the corresponding reflectivity values listed in Table 3.1 is shown in FIG. 3H.

With reference to the following Table 3.2 and Table 3.3, another reflected light is obtained from the third film layer 389 irradiated by the standard illuminant D65, another color index of the another reflected light is defined according to the CIE 1976 L*a*b* color space, the another color index is CI3, the another reflected light has another maximum reflectivity in another spectrum in the wavelength range of 380 nm to 780 nm, a wavelength range of a wavelength corresponding to the another maximum reflectivity minus 50 nm to the wavelength thereto plus 50 nm is another high reflectivity section, a wavelength range remained in a wavelength range of 380 nm to 780 nm excluding the another high reflectivity section is another second reflectivity section, an average reflectivity in the another high reflectivity section is $R3_{high}$, an average reflectivity in the another second reflectivity section is $R3_2$, the wavelength corresponding to the another maximum reflectivity is $\lambda_{RMax}$, the another maximum reflectivity is $R_{Max}$, and an average reflectivity of the another reflected light in the wavelength range of 380 nm to 780 nm is $R_{3878}$. The following Table 3.2 and Table 3.3 list the parameter values according to the aforementioned definitions of the optical lens assembly 300 in the 3rd embodiment.

With reference to the following Table 3.4, a maximum field of view of the optical lens assembly 300 is FOV. In a direction along the optical axis z, a distance between a most object-side end 315 of the lens barrel 310 and a most image-side end 316 of the lens barrel 310 is Db, a distance between the most object-side end 315 of the lens barrel 310 and the first film layer 349 is Ds1, and a distance between the most object-side end 315 of the lens barrel 310 and the first film layer 359 is Ds2. A diameter of the light entering hole 311 is φb, a diameter of the light passing hole 341 is φs1, and a diameter of the light passing hole 351 is φS2. A thickness in the direction along the optical axis z of the first light blocking sheet 340 is Ts1, and a thickness in the direction along the optical axis z of the second light blocking sheet 350 is Ts2. The following Table 3.4 lists the parameter values according to the aforementioned definitions of the optical lens assembly 300 in the 1st embodiment.

TABLE 3.1

| Wavelength (nm) | 1st lens element-peripheral image-side surface | 1st lens element-optical effective object-side surface |
| --- | --- | --- |
| 380 | 22.8855 | 24.9187 |
| 381 | 21.4447 | 24.4597 |
| 382 | 20.4477 | 23.7284 |
| 383 | 19.1480 | 22.9525 |
| 384 | 18.0618 | 21.8881 |
| 385 | 17.0734 | 21.4246 |
| 386 | 16.0328 | 20.8750 |
| 387 | 15.0127 | 20.1195 |
| 388 | 14.1026 | 19.4997 |
| 389 | 13.1253 | 18.7424 |
| 390 | 12.1780 | 17.9810 |
| 391 | 11.3753 | 17.2883 |
| 392 | 10.5274 | 16.5558 |
| 393 | 9.7866 | 15.9688 |
| 394 | 9.0401 | 15.2542 |
| 395 | 8.3521 | 14.6754 |
| 396 | 7.6550 | 13.9682 |
| 397 | 7.0576 | 13.3030 |
| 398 | 6.5004 | 12.6523 |
| 399 | 5.9813 | 12.0081 |
| 400 | 5.5252 | 11.5072 |
| 401 | 5.0935 | 10.9106 |
| 402 | 4.6776 | 10.4070 |
| 403 | 4.2876 | 9.8733 |
| 404 | 3.9525 | 9.3069 |
| 405 | 3.6269 | 8.7913 |
| 406 | 3.3530 | 8.3095 |
| 407 | 3.1225 | 7.8481 |
| 408 | 2.9209 | 7.4307 |
| 409 | 2.7302 | 7.0076 |
| 410 | 2.5666 | 6.5921 |
| 411 | 2.4255 | 6.2186 |
| 412 | 2.2858 | 5.8507 |
| 413 | 2.2110 | 5.4716 |
| 414 | 2.1438 | 5.1371 |
| 415 | 2.0678 | 4.8215 |
| 416 | 2.0489 | 4.5278 |
| 417 | 2.0102 | 4.2656 |
| 418 | 1.9864 | 3.9956 |
| 419 | 1.9869 | 3.7413 |
| 420 | 1.9880 | 3.4996 |
| 421 | 2.0070 | 3.2712 |
| 422 | 2.0359 | 3.0681 |
| 423 | 2.0811 | 2.8706 |
| 424 | 2.1106 | 2.6983 |
| 425 | 2.1597 | 2.5224 |
| 426 | 2.2067 | 2.3647 |
| 427 | 2.2538 | 2.2148 |
| 428 | 2.3172 | 2.0660 |
| 429 | 2.3711 | 1.9463 |
| 430 | 2.4389 | 1.8250 |
| 431 | 2.5098 | 1.7127 |
| 432 | 2.5653 | 1.6112 |
| 433 | 2.6322 | 1.5173 |
| 434 | 2.6906 | 1.4305 |
| 435 | 2.7527 | 1.3558 |
| 436 | 2.8104 | 1.2828 |
| 437 | 2.8768 | 1.2097 |
| 438 | 2.9470 | 1.1492 |
| 439 | 2.9996 | 1.1066 |
| 440 | 3.0684 | 1.0516 |
| 441 | 3.1116 | 1.0149 |
| 442 | 3.1670 | 0.9606 |
| 443 | 3.2064 | 0.9308 |
| 444 | 3.2620 | 0.9010 |
| 445 | 3.3125 | 0.8715 |
| 446 | 3.3527 | 0.8562 |
| 447 | 3.3832 | 0.8303 |
| 448 | 3.4229 | 0.8100 |
| 449 | 3.4519 | 0.7914 |
| 450 | 3.4811 | 0.7715 |
| 451 | 3.4993 | 0.7704 |
| 452 | 3.5343 | 0.7554 |
| 453 | 3.5584 | 0.7501 |
| 454 | 3.5834 | 0.7442 |
| 455 | 3.5870 | 0.7481 |
| 456 | 3.5962 | 0.7320 |
| 457 | 3.6013 | 0.7314 |
| 458 | 3.6105 | 0.7308 |
| 459 | 3.6184 | 0.7227 |
| 460 | 3.6171 | 0.7233 |

TABLE 3.1-continued

| Wavelength (nm) | 1st lens element-peripheral image-side surface | 1st lens element-optical effective object-side surface |
|---|---|---|
| 461 | 3.6163 | 0.7290 |
| 462 | 3.6116 | 0.7338 |
| 463 | 3.6039 | 0.7389 |
| 464 | 3.5902 | 0.7337 |
| 465 | 3.5708 | 0.7383 |
| 466 | 3.5578 | 0.7362 |
| 467 | 3.5393 | 0.7430 |
| 468 | 3.5249 | 0.7422 |
| 469 | 3.5106 | 0.7506 |
| 470 | 3.4904 | 0.7510 |
| 471 | 3.4493 | 0.7491 |
| 472 | 3.4273 | 0.7593 |
| 473 | 3.3955 | 0.7588 |
| 474 | 3.3657 | 0.7589 |
| 475 | 3.3377 | 0.7603 |
| 476 | 3.3043 | 0.7657 |
| 477 | 3.2676 | 0.7668 |
| 478 | 3.2304 | 0.7675 |
| 479 | 3.1919 | 0.7665 |
| 480 | 3.1508 | 0.7690 |
| 481 | 3.1096 | 0.7696 |
| 482 | 3.0737 | 0.7724 |
| 483 | 3.0283 | 0.7624 |
| 484 | 2.9933 | 0.7688 |
| 485 | 2.9441 | 0.7700 |
| 486 | 2.8990 | 0.7658 |
| 487 | 2.8602 | 0.7673 |
| 488 | 2.8070 | 0.7621 |
| 489 | 2.7584 | 0.7604 |
| 490 | 2.7129 | 0.7595 |
| 491 | 2.6706 | 0.7548 |
| 492 | 2.6225 | 0.7572 |
| 493 | 2.5720 | 0.7523 |
| 494 | 2.5233 | 0.7494 |
| 495 | 2.4734 | 0.7424 |
| 496 | 2.4247 | 0.7408 |
| 497 | 2.3752 | 0.7342 |
| 498 | 2.3268 | 0.7311 |
| 499 | 2.2853 | 0.7281 |
| 500 | 2.2315 | 0.7238 |
| 501 | 2.1815 | 0.7186 |
| 502 | 2.1338 | 0.7106 |
| 503 | 2.0822 | 0.7067 |
| 504 | 2.0370 | 0.7007 |
| 505 | 1.9901 | 0.6934 |
| 506 | 1.9436 | 0.6908 |
| 507 | 1.9002 | 0.6841 |
| 508 | 1.8498 | 0.6791 |
| 509 | 1.8026 | 0.6700 |
| 510 | 1.7557 | 0.6600 |
| 511 | 1.7120 | 0.6586 |
| 512 | 1.6682 | 0.6489 |
| 513 | 1.6256 | 0.6429 |
| 514 | 1.5827 | 0.6369 |
| 515 | 1.5403 | 0.6288 |
| 516 | 1.4963 | 0.6219 |
| 517 | 1.4545 | 0.6137 |
| 518 | 1.4126 | 0.6054 |
| 519 | 1.3745 | 0.5978 |
| 520 | 1.3315 | 0.5910 |
| 521 | 1.2942 | 0.5836 |
| 522 | 1.2571 | 0.5772 |
| 523 | 1.2186 | 0.5707 |
| 524 | 1.1830 | 0.5621 |
| 525 | 1.1447 | 0.5534 |
| 526 | 1.1103 | 0.5467 |
| 527 | 1.0772 | 0.5379 |
| 528 | 1.0439 | 0.5328 |
| 529 | 1.0123 | 0.5232 |
| 530 | 0.9793 | 0.5156 |
| 531 | 0.9480 | 0.5084 |
| 532 | 0.9171 | 0.5025 |
| 533 | 0.8857 | 0.4933 |
| 534 | 0.8560 | 0.4851 |
| 535 | 0.8273 | 0.4777 |
| 536 | 0.8011 | 0.4713 |
| 537 | 0.7748 | 0.4640 |
| 538 | 0.7480 | 0.4568 |
| 539 | 0.7235 | 0.4487 |
| 540 | 0.6967 | 0.4399 |
| 541 | 0.6716 | 0.4337 |
| 542 | 0.6493 | 0.4282 |
| 543 | 0.6267 | 0.4184 |
| 544 | 0.6054 | 0.4130 |
| 545 | 0.5846 | 0.4068 |
| 546 | 0.5640 | 0.4002 |
| 547 | 0.5421 | 0.3928 |
| 548 | 0.5237 | 0.3850 |
| 549 | 0.5043 | 0.3798 |
| 550 | 0.4887 | 0.3726 |
| 551 | 0.4710 | 0.3640 |
| 552 | 0.4566 | 0.3596 |
| 553 | 0.4408 | 0.3532 |
| 554 | 0.4230 | 0.3469 |
| 555 | 0.4101 | 0.3402 |
| 556 | 0.3933 | 0.3333 |
| 557 | 0.3803 | 0.3278 |
| 558 | 0.3682 | 0.3211 |
| 559 | 0.3555 | 0.3164 |
| 560 | 0.3436 | 0.3098 |
| 561 | 0.3315 | 0.3041 |
| 562 | 0.3201 | 0.2985 |
| 563 | 0.3094 | 0.2940 |
| 564 | 0.2987 | 0.2850 |
| 565 | 0.2888 | 0.2787 |
| 566 | 0.2797 | 0.2733 |
| 567 | 0.2724 | 0.2691 |
| 568 | 0.2623 | 0.2661 |
| 569 | 0.2548 | 0.2580 |
| 570 | 0.2467 | 0.2524 |
| 571 | 0.2363 | 0.2450 |
| 572 | 0.2328 | 0.2398 |
| 573 | 0.2251 | 0.2353 |
| 574 | 0.2183 | 0.2303 |
| 575 | 0.2147 | 0.2261 |
| 576 | 0.2060 | 0.2204 |
| 577 | 0.2014 | 0.2160 |
| 578 | 0.1958 | 0.2106 |
| 579 | 0.1894 | 0.2044 |
| 580 | 0.1870 | 0.1987 |
| 581 | 0.1813 | 0.1945 |
| 582 | 0.1795 | 0.1926 |
| 583 | 0.1759 | 0.1865 |
| 584 | 0.1737 | 0.1825 |
| 585 | 0.1686 | 0.1782 |
| 586 | 0.1624 | 0.1708 |
| 587 | 0.1590 | 0.1652 |
| 588 | 0.1562 | 0.1598 |
| 589 | 0.1563 | 0.1582 |
| 590 | 0.1543 | 0.1534 |
| 591 | 0.1491 | 0.1487 |
| 592 | 0.1499 | 0.1453 |
| 593 | 0.1443 | 0.1398 |
| 594 | 0.1425 | 0.1362 |
| 595 | 0.1420 | 0.1330 |
| 596 | 0.1385 | 0.1274 |
| 597 | 0.1410 | 0.1240 |
| 598 | 0.1396 | 0.1197 |
| 599 | 0.1382 | 0.1158 |
| 600 | 0.1346 | 0.1111 |
| 601 | 0.1346 | 0.1079 |
| 602 | 0.1317 | 0.1030 |
| 603 | 0.1319 | 0.0995 |
| 604 | 0.1337 | 0.0965 |
| 605 | 0.1295 | 0.0924 |
| 606 | 0.1313 | 0.0886 |
| 607 | 0.1297 | 0.0862 |
| 608 | 0.1279 | 0.0823 |
| 609 | 0.1277 | 0.0778 |
| 610 | 0.1252 | 0.0739 |
| 611 | 0.1250 | 0.0713 |
| 612 | 0.1271 | 0.0676 |
| 613 | 0.1253 | 0.0663 |
| 614 | 0.1261 | 0.0638 |

TABLE 3.1-continued

| Wavelength (nm) | 1st lens element-peripheral image-side surface | 1st lens element-optical effective object-side surface |
|---|---|---|
| 615 | 0.1240 | 0.0606 |
| 616 | 0.1228 | 0.0564 |
| 617 | 0.1216 | 0.0512 |
| 618 | 0.1210 | 0.0498 |
| 619 | 0.1224 | 0.0483 |
| 620 | 0.1227 | 0.0451 |
| 621 | 0.1204 | 0.0438 |
| 622 | 0.1200 | 0.0400 |
| 623 | 0.1195 | 0.0386 |
| 624 | 0.1192 | 0.0354 |
| 625 | 0.1163 | 0.0336 |
| 626 | 0.1182 | 0.0315 |
| 627 | 0.1168 | 0.0281 |
| 628 | 0.1166 | 0.0286 |
| 629 | 0.1164 | 0.0254 |
| 630 | 0.1146 | 0.0236 |
| 631 | 0.1140 | 0.0220 |
| 632 | 0.1138 | 0.0194 |
| 633 | 0.1121 | 0.0186 |
| 634 | 0.1121 | 0.0173 |
| 635 | 0.1122 | 0.0167 |
| 636 | 0.1114 | 0.0169 |
| 637 | 0.1087 | 0.0149 |
| 638 | 0.1074 | 0.0145 |
| 639 | 0.1077 | 0.0129 |
| 640 | 0.1063 | 0.0121 |
| 641 | 0.1041 | 0.0109 |
| 642 | 0.1039 | 0.0121 |
| 643 | 0.1035 | 0.0121 |
| 644 | 0.1031 | 0.0122 |
| 645 | 0.1034 | 0.0122 |
| 646 | 0.0986 | 0.0110 |
| 647 | 0.0980 | 0.0119 |
| 648 | 0.0957 | 0.0125 |
| 649 | 0.0955 | 0.0127 |
| 650 | 0.0970 | 0.0139 |
| 651 | 0.0947 | 0.0153 |
| 652 | 0.0935 | 0.0161 |
| 653 | 0.0923 | 0.0167 |
| 654 | 0.0883 | 0.0182 |
| 655 | 0.0880 | 0.0189 |
| 656 | 0.0849 | 0.0210 |
| 657 | 0.0838 | 0.0231 |
| 658 | 0.0828 | 0.0238 |
| 659 | 0.0846 | 0.0269 |
| 660 | 0.0819 | 0.0299 |
| 661 | 0.0777 | 0.0312 |
| 662 | 0.0782 | 0.0347 |
| 663 | 0.0735 | 0.0357 |
| 664 | 0.0750 | 0.0391 |
| 665 | 0.0745 | 0.0428 |
| 666 | 0.0716 | 0.0459 |
| 667 | 0.0719 | 0.0494 |
| 668 | 0.0689 | 0.0541 |
| 669 | 0.0671 | 0.0575 |
| 670 | 0.0643 | 0.0610 |
| 671 | 0.0652 | 0.0645 |
| 672 | 0.0633 | 0.0685 |
| 673 | 0.0625 | 0.0737 |
| 674 | 0.0627 | 0.0801 |
| 675 | 0.0602 | 0.0831 |
| 676 | 0.0593 | 0.0905 |
| 677 | 0.0575 | 0.0949 |
| 678 | 0.0541 | 0.1002 |
| 679 | 0.0560 | 0.1044 |
| 680 | 0.0534 | 0.1120 |
| 681 | 0.0533 | 0.1180 |
| 682 | 0.0531 | 0.1237 |
| 683 | 0.0510 | 0.1316 |
| 684 | 0.0512 | 0.1385 |
| 685 | 0.0475 | 0.1454 |
| 686 | 0.0468 | 0.1511 |
| 687 | 0.0454 | 0.1603 |
| 688 | 0.0469 | 0.1664 |
| 689 | 0.0469 | 0.1755 |
| 690 | 0.0459 | 0.1833 |
| 691 | 0.0455 | 0.1917 |
| 692 | 0.0429 | 0.1988 |
| 693 | 0.0427 | 0.2070 |
| 694 | 0.0430 | 0.2163 |
| 695 | 0.0425 | 0.2273 |
| 696 | 0.0445 | 0.2360 |
| 697 | 0.0426 | 0.2455 |
| 698 | 0.0432 | 0.2557 |
| 699 | 0.0460 | 0.2667 |
| 700 | 0.0411 | 0.2770 |
| 701 | 0.0430 | 0.2867 |
| 702 | 0.0438 | 0.2969 |
| 703 | 0.0437 | 0.3079 |
| 704 | 0.0464 | 0.3209 |
| 705 | 0.0477 | 0.3313 |
| 706 | 0.0477 | 0.3431 |
| 707 | 0.0466 | 0.3555 |
| 708 | 0.0491 | 0.3657 |
| 709 | 0.0487 | 0.3793 |
| 710 | 0.0507 | 0.3935 |
| 711 | 0.0530 | 0.4065 |
| 712 | 0.0538 | 0.4193 |
| 713 | 0.0576 | 0.4327 |
| 714 | 0.0589 | 0.4466 |
| 715 | 0.0590 | 0.4621 |
| 716 | 0.0613 | 0.4744 |
| 717 | 0.0618 | 0.4881 |
| 718 | 0.0650 | 0.5028 |
| 719 | 0.0684 | 0.5188 |
| 720 | 0.0717 | 0.5356 |
| 721 | 0.0751 | 0.5496 |
| 722 | 0.0764 | 0.5651 |
| 723 | 0.0785 | 0.5807 |
| 724 | 0.0795 | 0.5974 |
| 725 | 0.0847 | 0.6153 |
| 726 | 0.0902 | 0.6294 |
| 727 | 0.0939 | 0.6467 |
| 728 | 0.0958 | 0.6667 |
| 729 | 0.1008 | 0.6829 |
| 730 | 0.1039 | 0.7004 |
| 731 | 0.1068 | 0.7186 |
| 732 | 0.1118 | 0.7353 |
| 733 | 0.1174 | 0.7537 |
| 734 | 0.1211 | 0.7707 |
| 735 | 0.1268 | 0.7917 |
| 736 | 0.1308 | 0.8103 |
| 737 | 0.1370 | 0.8313 |
| 738 | 0.1416 | 0.8508 |
| 739 | 0.1474 | 0.8703 |
| 740 | 0.1536 | 0.8908 |
| 741 | 0.1584 | 0.9103 |
| 742 | 0.1660 | 0.9319 |
| 743 | 0.1722 | 0.9539 |
| 744 | 0.1775 | 0.9737 |
| 745 | 0.1835 | 0.9967 |
| 746 | 0.1897 | 1.0176 |
| 747 | 0.1949 | 1.0396 |
| 748 | 0.2035 | 1.0608 |
| 749 | 0.2108 | 1.0837 |
| 750 | 0.2204 | 1.1066 |
| 751 | 0.2286 | 1.1297 |
| 752 | 0.2358 | 1.1556 |
| 753 | 0.2420 | 1.1755 |
| 754 | 0.2516 | 1.1995 |
| 755 | 0.2600 | 1.2231 |
| 756 | 0.2682 | 1.2473 |
| 757 | 0.2767 | 1.2730 |
| 758 | 0.2871 | 1.2949 |
| 759 | 0.2974 | 1.3226 |
| 760 | 0.3059 | 1.3482 |
| 761 | 0.3135 | 1.3739 |
| 762 | 0.3242 | 1.3989 |
| 763 | 0.3316 | 1.4223 |
| 764 | 0.3428 | 1.4481 |
| 765 | 0.3519 | 1.4742 |
| 766 | 0.3665 | 1.5030 |
| 767 | 0.3764 | 1.5281 |
| 768 | 0.3861 | 1.5551 |

TABLE 3.1-continued

| Wavelength (nm) | 1st lens element-peripheral image-side surface | 1st lens element-optical effective object-side surface |
|---|---|---|
| 769 | 0.3970 | 1.5806 |
| 770 | 0.4054 | 1.6076 |
| 771 | 0.4209 | 1.6349 |
| 772 | 0.4312 | 1.6623 |
| 773 | 0.4426 | 1.6894 |
| 774 | 0.4561 | 1.7193 |
| 775 | 0.4680 | 1.7461 |
| 776 | 0.4792 | 1.7768 |
| 777 | 0.4908 | 1.8044 |
| 778 | 0.5023 | 1.8322 |
| 779 | 0.5179 | 1.8608 |
| 780 | 0.5302 | 1.8896 |

TABLE 3.2

|  | 1st lens element-peripheral image-side surface | 1st lens element-optical effective object-side surface |
|---|---|---|
| $R_{Max}$ (%) | 22.8855 | 24.9187 |
| $\lambda_{RMax}$ (nm) | 380 | 380 |
| $R3_{high}$ (%) | 6.88 | 10.56 |
| $R3_2$ (%) | 0.90 | 0.52 |
| $R3_{high}/R3_2$ | 7.61 | 20.17 |
| $R_{3878}$ (%) | 1.66 | 1.80 |

TABLE 3.3

| Measurement items | L* | a* | b* | CI3 = {(L*) × [(a*)^2 + (b*)^2]}^1/2 |
|---|---|---|---|---|
| 1st lens element-peripheral image-side surface | 6.76 | 1.46 | −23.62 | 61.51 |
| 1st lens element-optical effective object-side surface | 3.27 | 1.10 | −12.84 | 23.30 |

TABLE 3.4

| FOV (deg.) | 157.8 | φs2 (mm) | 1.15 |
|---|---|---|---|
| Db (mm) | 4.87 | Ts1 (μm) | 40 |
| Ds1 (mm) | 1.01 | Ts2 (μm) | 23 |
| Ds2 (mm) | 1.36 | Ds1/Db | 0.21 |
| φb (mm) | 4.92 | Ds2/Db | 0.28 |
| φs1 (mm) | 1.9 | | |

4th Embodiment

Figure 4A:
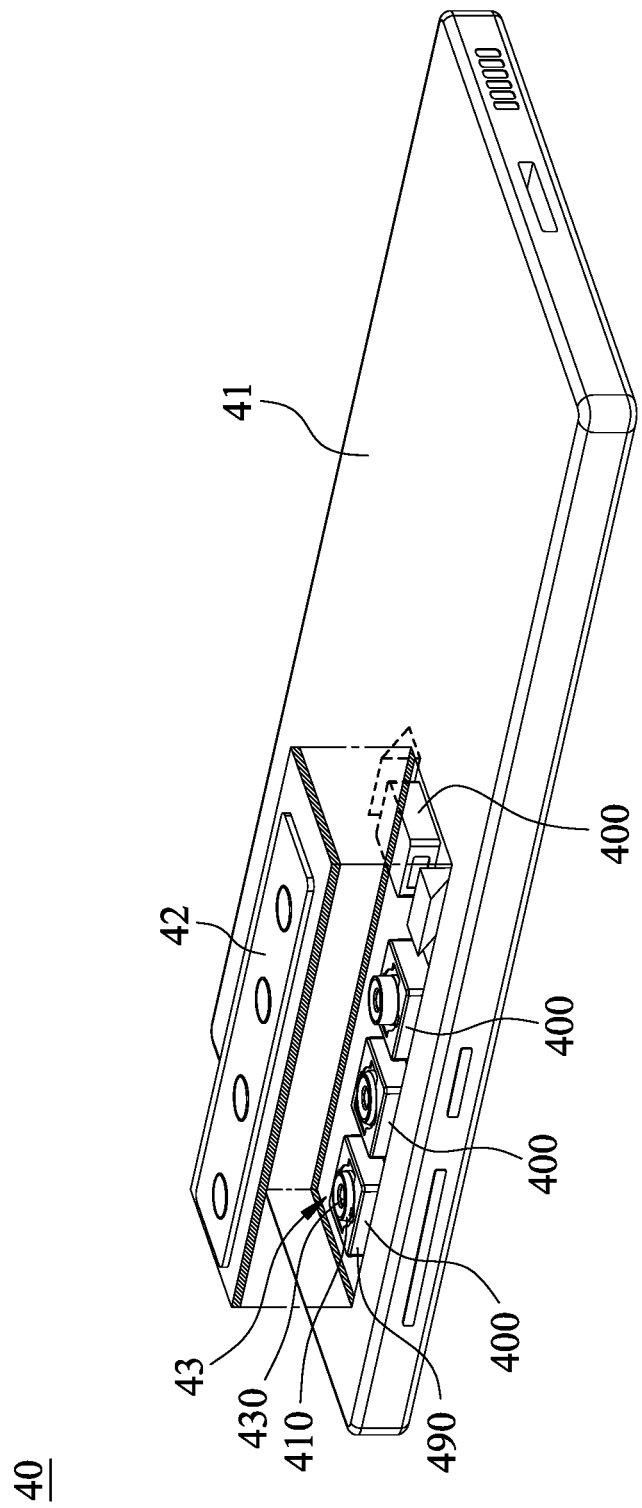
FIG. 4A is a three-dimensional view of an electronic device according to the 4th embodiment of the present disclosure.
Figure 4B:
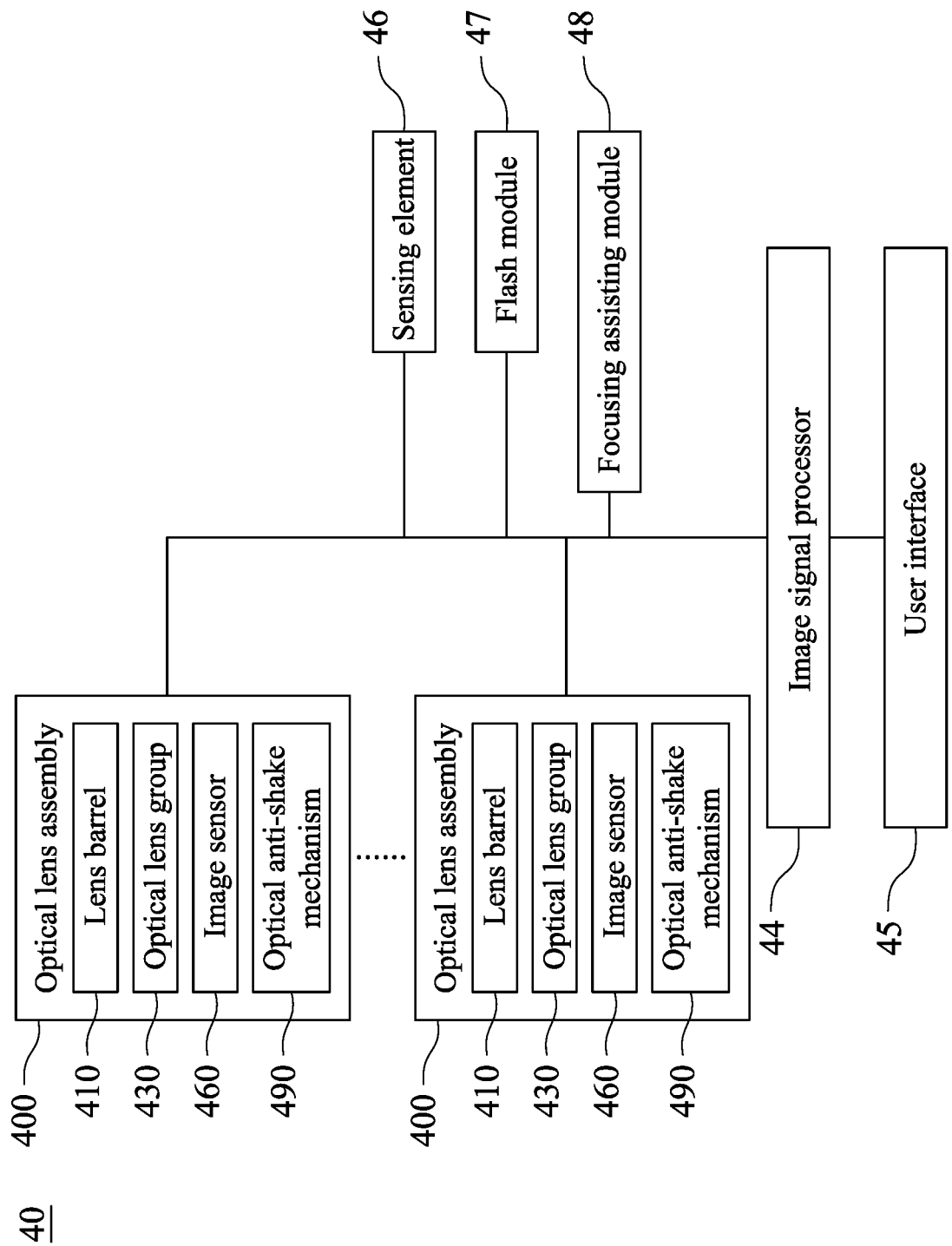
FIG. 4B is a block diagram of the electronic device in FIG. 4A.

FIG. 4A is a three-dimensional view of an electronic device 40 according to the 4th embodiment of the present disclosure, and FIG. 4B is a block diagram of the electronic device 40 in FIG. 4A. With reference to FIG. 4A and FIG. 4B, the electronic device 40 includes at least one optical lens assembly 400, which includes a lens barrel 410 and an optical lens group 430. The optical lens assembly 400 may be the aforementioned optical lens assembly 100 of the 1st embodiment, the aforementioned optical lens assembly 200 of the 2nd embodiment, the aforementioned optical lens assembly 300 of the 3rd embodiment, or another optical lens assembly according to present disclosure.

Specifically, the electronic device 40 is a smart phone and includes four optical lens assemblies 400. From a left side to a right side in FIG. 4A, the four optical lens assemblies 400 may be an ultra-wide-angle lens assembly (e.g., the maximum field of view in a range of 93 degrees to 175 degrees), a wide-angle main lens assembly (e.g., the maximum field of view in a range of 65 degrees to 90 degrees), a telephoto lens assembly (e.g., the maximum field of view in a range of 20 degrees to 50 degrees) and an ultra telephoto lens assembly (e.g., the maximum field of view in a range of 5 degrees to 20 degrees) in order, and the maximum field of view of each of the optical lens assemblies 400 is not limited thereto. The four optical lens assemblies 400 are disposed in an inner space 43 of the electronic device 40, and the light enters the four optical lens assemblies 400 via four light entering holes on a lens cover 42 of a housing 41 of the electronic device 40. It should be understood that FIG. 4A is only an exploded schematic view of the lens cover 42 and the inner space 43, and does not mean that the lens cover 42 is separated from the electronic device 40 during a user's operation.

In addition, the electronic device 40 can further include but not be limited to a control unit, a storage unit, a random access memory, a read-only memory, or a combination thereof.

Furthermore, the user activates the capturing mode via the user interface 45 of the electronic device 40. At this moment, the imaging light of the optical lens group 430 is converged on the image sensor 460, and the electronic signal associated with image is output to an image signal processor (ISP) 44.

To meet a specification of a camera of the electronic device 40, the electronic device 40 can further include an optical anti-shake mechanism 490, which can be an optical image stabilization (OIS). Furthermore, the electronic device 40 can further include at least one auxiliary optical element (its reference numeral is omitted) and at least one sensing element 46. According to the 4th embodiment, the auxiliary optical elements are a flash module 47 and a focusing assisting module 48. The flash module 47 can be configured to compensate a color temperature, and the focusing assisting module 48 can be an infrared distance measurement component, a laser focus module, etc. The sensing element 46 can have functions for sensing physical momentum and kinetic energy, such as an accelerator, a gyroscope, a Hall Effect Element, to sense shaking or jitters applied by hands of the user or external environments. Accordingly, the optical lens assembly 400 of the electronic device 40 equipped with an auto-focusing mechanism and the optical anti-shake mechanism 490 can be enhanced to achieve the superior image quality. Furthermore, the electronic device 40 according to the present disclosure can have a capturing function with multiple modes, such as taking optimized selfies, high dynamic range (HDR) under a low light condition, 4K resolution recording, etc. Furthermore, the users can visually see the captured image through the user interface 45 (i.e., the display screen, the touch screen) and manually operate the view finding range on the user interface 45 to achieve the autofocus function of what you see is what you get.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising:
a lens barrel comprising a light entering hole, which is configured for allowing a light to enter the lens barrel; and
an optical lens group, wherein the lens barrel accommodates the optical lens group, and an optical axis passes through the optical lens group;
wherein the optical lens group comprises:
a plurality of lens elements; and
at least one light blocking sheet being an opaque sheet-shaped element and surrounding the optical axis to form a light passing hole, wherein the light blocking sheet comprises an object-side surface and an image-side surface, the object-side surface is located more adjacent to the light entering hole than the image-side surface thereto, and a first film layer is disposed on the object-side surface;
wherein a reflected light is obtained from the first film layer irradiated by a standard illuminant D65, a color index of the reflected light is defined according to a CIE 1976 L*a*b* color space, the color index is CI, the reflected light has a maximum reflectivity in a spectrum in a wavelength range of 380 nm to 780 nm, a wavelength range of a wavelength corresponding to the maximum reflectivity minus 50 nm to the wavelength thereto plus 50 nm is a high reflectivity section, a wavelength range remained in a wavelength range of 380 nm to 780 nm excluding the high reflectivity section is a second reflectivity section, an average reflectivity in the high reflectivity section is $R_{high}$, an average reflectivity in the second reflectivity section is $R_2$, and the following conditions are satisfied:

$CI=\{(L^*)\times[(a^*)^2+(b^*)^2]\}^{1/2}$;

$8 \leq CI \leq 41$; and $1.8 \leq R_{high}/R_2 \leq 6.2$.

2. The optical lens assembly of claim 1, wherein the color index is CI, the average reflectivity in the high reflectivity section is $R_{high}$, the average reflectivity in the second reflectivity section is $R_2$, and the following conditions are satisfied:

$11 \leq CI \leq 28$; and $2.2 \leq R_{high}/R_2 \leq 4.8$.

3. The optical lens assembly of claim 1, wherein the wavelength corresponding to the maximum reflectivity is $\lambda_{RMax}$, and the following condition is satisfied:

380 nm $\leq \lambda_{RMax} \leq$ 580 nm.

4. The optical lens assembly of claim 3, wherein the maximum reflectivity is $R_{Max}$, and the following condition is satisfied:

$0.5\% \leq R_{max} \leq 4\%$.

5. The optical lens assembly of claim 1, wherein an average reflectivity of the reflected light in the wavelength range of 380 nm to 780 nm is $R_{3878}$, and the following condition is satisfied:

$0.1\% \leq R_{3878} \leq 2\%$.

6. The optical lens assembly of claim 1, wherein a difference appears between two color indexes of any two points, respectively, on the first film layer, an absolute value of the difference is |ΔCI|, and the following condition is satisfied:

$0 \leq |\Delta CI| \leq 4.7$.

7. The optical lens assembly of claim 1, wherein the first film layer is disposed from the light passing hole along a direction being away from the optical axis, and a coverage area of the first film layer is smaller than an area of the object-side surface.

8. The optical lens assembly of claim 1, wherein a number of the at least one light blocking sheet is at least two, and the first film layer is disposed on the object-side surface of each of the light blocking sheets.

9. The optical lens assembly of claim 8, wherein diameters of the light passing holes of the at least two light blocking sheets, respectively, are different, and the diameter of the light passing hole of one of the at least two light blocking sheets closer to an object side is greater than the diameter of the light passing hole of the other of the at least two light blocking sheets.

10. The optical lens assembly of claim 1, wherein a thickness in a direction along the optical axis of the light blocking sheet is Ts, and the following condition is satisfied:

7 μm < $Ts$ < 50 μm.

11. The optical lens assembly of claim 1, wherein a diameter of the light entering hole is φb, a diameter of the light passing hole is φs, and the following condition is satisfied:

φs < φb.

12. The optical lens assembly of claim 11, wherein the diameter of the light entering hole is φb, the diameter of the light passing hole is φs, and the following condition is satisfied:

$0.31 \leq (\varphi b - \varphi s)/\varphi b \leq 0.95$.

13. The optical lens assembly of claim 12, wherein a maximum field of view of the optical lens assembly is FOV, and the following condition is satisfied:

93 degrees ≤ FOV ≤ 175 degrees.

14. The optical lens assembly of claim 12, wherein in a direction along the optical axis, a distance between a most object-side end of the lens barrel and a most image-side end of the lens barrel is Db, a distance between the most object-side end of the lens barrel and the first film layer is Ds, and the following condition is satisfied:

$0.05 \leq Ds/Db \leq 0.41$.

15. The optical lens assembly of claim 1, wherein an object-side portion of the lens barrel comprises:
a top wall surrounding the optical axis to form the light entering hole, wherein a second film layer is disposed on the top wall;
wherein another reflected light is obtained from the second film layer irradiated by the standard illuminant D65, another color index of the another reflected light is defined according to the CIE 1976 L*a*b* color space, the another color index is CI2, the another reflected light has another maximum reflectivity in another spectrum in the wavelength range of 380 nm to 780 nm, a wavelength range of a wavelength corresponding to the another maximum reflectivity minus 50 nm to the wavelength thereto plus 50 nm is another high reflectivity section, a wavelength range remained in a wavelength range of 380 nm to 780 nm excluding the another high reflectivity section is another second reflectivity section, an average reflectivity in the another high reflectivity section is $R2_{high}$, an average reflectivity in the another second reflectivity section is $R2_2$, and the following conditions are satisfied:

$$CI2=\{(L^*) \times [(a^*)^2+(b^*)^2]\}^{1/2};$$

$$11 \leq CI2 \leq 41; \text{ and}$$

$$1.8 \leq R2_{high}/R2_2 \leq 6.2.$$

16. The optical lens assembly of claim 1, wherein one of the lens elements is disposed on an object side of the light blocking sheet, and the one of the lens elements comprises:
  an optical effective region configured for being passed through by the light; and
  a peripheral region located farther from the optical axis than the optical effective region therefrom, wherein a third film layer is disposed on at least one of a peripheral object-side surface and a peripheral image-side surface of the peripheral region;
  wherein further another reflected light is obtained from the third film layer irradiated by the standard illuminant D65, further another color index of the further another reflected light is defined according to the CIE 1976 L*a*b* color space, the further another color index is CI3, and the following conditions are satisfied:

$$CI3=\{(L^*) \times [(a^*)^2+(d^*)^2]\}^{1/2}; \text{ and}$$

$$11 \leq CI3 \leq 75.$$

17. The optical lens assembly of claim 16, wherein the further another reflected light has further another maximum reflectivity in further another spectrum in the wavelength range of 380 nm to 780 nm, a wavelength range of a wavelength corresponding to the further another maximum reflectivity minus 50 nm to the wavelength thereto plus 50 nm is further another high reflectivity section, a wavelength range remained in a wavelength range of 380 nm to 780 nm excluding the further another high reflectivity section is further another second reflectivity section, an average reflectivity in the further another high reflectivity section is $R3_{high}$, an average reflectivity in the further another second reflectivity section is $R3_2$, and the following condition is satisfied:

$$2.5 R3_{high}/R3_2 \leq 34.$$

18. An electronic device, comprising:
  the optical lens assembly of claim 1.

* * * * *